(12) United States Patent
Chopping et al.

(10) Patent No.: US 7,167,453 B1
(45) Date of Patent: Jan. 23, 2007

(54) NETWORK INTERCONNECTIONS

(75) Inventors: Geoffrey Chopping, Wimborne (GB);
Thomad S Maddern, Wimborne (GB);
Bruce P Jensen, Wimborne (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 10/031,253

(22) PCT Filed: May 25, 2000

(86) PCT No.: PCT/GB00/01999

§ 371 (c)(1),
(2), (4) Date: May 31, 2002

(87) PCT Pub. No.: WO00/74320

PCT Pub. Date: Dec. 7, 2000

(30) Foreign Application Priority Data

May 27, 1999 (GB) .................................. 9912290.5

(51) Int. Cl.
*H04L 12/28* (2006.01)

(52) U.S. Cl. .................................................. 370/255

(58) Field of Classification Search ........ 370/254–256,
370/258, 400, 406–408; 398/3, 7, 12, 14,
398/19, 34, 68
See application file for complete search history.

(56) References Cited

U.S. PATENT DOCUMENTS

| | | | | |
|---|---|---|---|---|
| 5,654,956 A * | 8/1997 | Frene et al. | ................ | 370/386 |
| 6,075,631 A * | 6/2000 | Bala et al. | ................ | 398/1 |
| 6,301,261 B1 * | 10/2001 | Nakatsugawa et al. | ..... | 370/455 |
| 6,339,488 B1 * | 1/2002 | Beshai et al. | ................ | 398/59 |
| 6,526,020 B1 * | 2/2003 | Ando | ................ | 370/223 |
| 6,542,511 B1 * | 4/2003 | Livermore et al. | ......... | 370/406 |
| 6,631,018 B1 * | 10/2003 | Milton et al. | ................ | 398/59 |

* cited by examiner

*Primary Examiner*—Ricky Q. Ngo
*Assistant Examiner*—Jonathan Liou
(74) *Attorney, Agent, or Firm*—Kirschstein, et al.

(57) ABSTRACT

A partially interconnected network has a plurality of Allocated Nodes, each allocated to one of a number of AREAs, and further has a plurality of Star Nodes (STARs), and also has point-to-point interconnections between the Allocated Nodes and the STARs. The number of AREAs with Allocated Nodes connected to an individual STAR forms the number of ROUTEs from an individual STAR. The Allocated Nodes of a first of the AREAs are connected to a set comprising some, but not all, of the STARs. Further of the AREAs are similarly interconnected to further sets each comprising STARs. There is at least one connection choice between any two Allocated Nodes in different AREAs and where a connection route is two point-to-point interconnections connected in series by a STAR.

27 Claims, 36 Drawing Sheets

Area (Node)

Fig. 5.

AREAS →

| Single | 0 | 0 | 0 | 0 | 0 | 0 | 0 | 0 | 1 | 1 | 1 | 1 | 1 | 1 | 1 | 1 | 1 | 1 | 2 | 2 |
|---|---|---|---|---|---|---|---|---|---|---|---|---|---|---|---|---|---|---|---|---|
| STARS | 1 | 2 | 3 | 4 | 5 | 6 | 7 | 8 | 9 | 0 | 1 | 2 | 3 | 4 | 5 | 6 | 7 | 8 | 9 | 0 | 1 |

| STARS | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1  | 1 | 1 |   | 1 |   |   |   |   |   |   |   |   |   |   | 1 | 1 |   |   |   |   |   |
| 2  |   | 1 | 1 |   | 1 |   |   |   |   |   |   |   |   |   |   | 1 | 1 |   |   |   |   |
| 3  |   |   | 1 | 1 |   | 1 |   |   |   |   |   |   |   |   |   |   | 1 | 1 |   |   |   |
| 4  |   |   |   | 1 | 1 |   | 1 |   |   |   |   |   |   |   |   |   |   | 1 | 1 |   |   |
| 5  |   |   |   |   | 1 | 1 |   | 1 |   |   |   |   |   |   |   |   |   |   |   | 1 | 1 |
| 6  | 1 |   |   |   |   | 1 | 1 |   | 1 |   |   |   |   |   |   |   |   |   | 1 |   |   |
| 7  |   | 1 |   |   |   |   | 1 | 1 |   | 1 |   |   |   |   |   |   |   |   |   |   | 1 |
| 8  | 1 |   | 1 |   |   |   |   | 1 | 1 |   | 1 |   |   |   |   |   |   |   |   |   |   |
| 9  |   | 1 |   | 1 |   |   |   |   | 1 | 1 |   | 1 |   |   |   |   |   |   |   |   |   |
| 10 |   |   | 1 |   | 1 |   |   |   |   | 1 | 1 |   | 1 |   |   |   |   |   |   |   |   |
| 11 |   |   |   | 1 |   | 1 |   |   |   |   | 1 | 1 |   | 1 |   |   |   |   |   |   |   |
| 12 |   |   |   |   | 1 |   | 1 |   |   |   |   | 1 | 1 |   | 1 |   |   |   |   |   |   |
| 13 |   |   |   |   |   | 1 |   | 1 |   |   |   |   | 1 | 1 |   | 1 |   |   |   |   |   |
| 14 |   |   |   |   |   |   | 1 |   | 1 |   |   |   |   | 1 | 1 |   | 1 |   |   |   |   |
| 15 |   |   |   |   |   |   |   | 1 |   | 1 |   |   |   |   | 1 | 1 |   | 1 |   |   |   |
| 16 |   |   |   |   |   |   |   |   | 1 |   | 1 |   |   |   |   | 1 | 1 |   | 1 |   |   |
| 17 |   |   |   |   |   |   |   |   |   | 1 |   | 1 |   |   |   |   | 1 | 1 |   |   | 1 |
| 18 | 1 |   |   |   |   |   |   |   |   |   | 1 |   | 1 |   |   |   |   | 1 | 1 |   |   |
| 19 |   | 1 |   |   |   |   |   |   |   |   |   | 1 |   | 1 |   |   |   |   | 1 | 1 |   |
| 20 |   |   | 1 |   |   |   |   |   |   |   |   |   | 1 |   | 1 |   |   |   |   | 1 | 1 |
| 21 | 1 |   | 1 |   |   |   |   |   |   |   |   |   |   |   |   | 1 |   | 1 |   |   | 1 |

Fig. 7.

| STARS | AREAS Single | 0 | 0 | 0 | 0 | 0 | 0 | 0 | 0 | 0 | 1 | 1 | 1 | 1 | 1 | 1 | 1 | 1 | 1 | 1 | 2 | 2 |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 0 | 1 | 2 | 3 | 4 | 5 | 6 | 7 | 8 | 9 | 0 | 1 |
| 1 | | 1 | | | | 1 | 1 | | | | | | | | | | | 1 | | | 1 | |
| 2 | | 1 | 1 | | | | 1 | 1 | | | | | | | | | | | 1 | | | |
| 3 | | | 1 | 1 | | | | 1 | 1 | | | | | | | | | | | 1 | | |
| 4 | | | | 1 | 1 | | | | 1 | 1 | | | | | | | | | | | 1 | |
| 5 | | 1 | | | 1 | 1 | | | | 1 | 1 | | | | | | | | | | | |
| 6 | | | 1 | | | 1 | 1 | | | | 1 | 1 | | | | | | | | | | |
| 7 | | | | 1 | | | 1 | 1 | | | | 1 | 1 | | | | | | | | | |
| 8 | | | | | 1 | | | 1 | 1 | | | | 1 | 1 | | | | | | | | |
| 9 | | | | | | 1 | | | 1 | 1 | | | | 1 | 1 | | | | | | | |
| 10 | | | | | | | 1 | | | 1 | 1 | | | | 1 | 1 | | | | | | |
| 11 | | | | | | | | 1 | | | 1 | 1 | | | | 1 | 1 | | | | | |
| 12 | | | | | | | | | 1 | | | 1 | 1 | | | | 1 | 1 | | | | |
| 13 | | | | | | | | | | 1 | | | 1 | 1 | | | | 1 | 1 | | | |
| 14 | | | | | | | | | | | 1 | | | 1 | 1 | | | | 1 | 1 | | |
| 15 | | 1 | | | | | | | | | | 1 | | | 1 | 1 | | | | 1 | | |
| 16 | | | 1 | | | | | | | | | | 1 | | | 1 | 1 | | | | 1 | |
| 17 | | 1 | | 1 | | | | | | | | | | 1 | | | 1 | 1 | | | | |
| 18 | | | 1 | | 1 | | | | | | | | | | 1 | | | 1 | 1 | | | |
| 19 | | | | 1 | | 1 | | | | | | | | | | 1 | | | 1 | 1 | | |
| 20 | | | | | 1 | | 1 | | | | | | | | | | 1 | | | 1 | 1 | |
| 21 | | | | | | 1 | | 1 | | | | | | | | | | 1 | | | 1 | 1 |

Fig. 8.

| STARS | AREAS Single | 0 | 0 | 0 | 0 | 0 | 0 | 0 | 0 | 0 | 1 | 1 | 1 | 1 | 1 | 1 | 1 | 1 | 1 | 1 | 2 | 2 | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 0 | 1 | 2 | 3 | 4 | 5 | 6 | 7 | 8 | 9 | 0 | 1 | |
| 1 | | 1 | 1 | 1 | 1 | 1 | | | | | | | | | | | | | | | | | 1 |
| 2 | | 1 | | | | | 1 | 1 | 1 | 1 | | | | | | | | | | | | | 6 |
| 3 | | 1 | | | | | | | | | 1 | 1 | 1 | 1 | | | | | | | | | 8 |
| 4 | | 1 | | | | | | | | | | | | | 1 | 1 | 1 | 1 | | | | | 18 |
| 5 | | 1 | | | | | | | | | | | | | | | | | 1 | 1 | 1 | 1 | 21 |
| 6 | | | 1 | | | | 1 | | | | 1 | | | | | 1 | | | | 1 | | | 2 |
| 7 | | | 1 | | | 1 | | | | 1 | | | | 1 | | | | 1 | | | | 1 | 7 |
| 8 | | | 1 | | | | 1 | | | | 1 | | | | | 1 | | | 1 | | | | 9 |
| 9 | | | 1 | | | | | 1 | | | | 1 | | | | | 1 | | | | 1 | 1 | 19 |
| 10 | | | | 1 | | 1 | | | 1 | | | | 1 | | | | 1 | 1 | | | | | 5 |
| 11 | | | | 1 | | | 1 | | | 1 | | | 1 | | | 1 | | 1 | | | | | 12 |
| 12 | | | | 1 | | | | 1 | | | 1 | | | 1 | | | | | | | | 1 | 10 |
| 13 | | | | 1 | | | | | 1 | | | 1 | 1 | | 1 | | | | | | 1 | | 4 |
| 14 | | | | | 1 | 1 | | | | 1 | | | | 1 | 1 | | | | | | 1 | | 11 |
| 15 | | | | | 1 | | 1 | | | | 1 | | | | 1 | 1 | | | | | | 1 | 14 |
| 16 | | | | | 1 | | | 1 | | | | 1 | | | | 1 | | 1 | 1 | | | | 15 |
| 17 | | | | | 1 | | | | 1 | | | | 1 | 1 | | | | 1 | | 1 | 1 | | 20 |
| 18 | | | | | | 1 | 1 | | | 1 | | | | 1 | | | 1 | | | 1 | | 1 | 13 |
| 19 | | | | | | 1 | | 1 | | 1 | | | | | 1 | | | 1 | | | 1 | 1 | 3 |
| 20 | | | | | | | 1 | 1 | | | 1 | | | | | 1 | 1 | | | | 1 | | 17 |
| 21 | | | | | | | 1 | | 1 | | 1 | | | 1 | | | 1 | | 1 | | | | 16 |
| | | 0 | 0 | 0 | 1 | 1 | 0 | 0 | 1 | 2 | 0 | 0 | 0 | 1 | 1 | 1 | 1 | 1 | 1 | 2 | 0 | 1 | |
| | | 1 | 2 | 5 | 5 | 7 | 6 | 7 | 0 | 0 | 3 | 8 | 9 | 2 | 8 | 1 | 3 | 9 | 6 | 1 | 4 | 4 | |

Fig.11.

| AREAS | STARS |
|-------|-------|
| CHOICES | ROUTES |

A (A-1) C = S (R)(R-1)

EXAMPLES OF ROTATIONAL PATTERNS

| | | |
|---|---|---|
| 3( 2 ) 1 = 3 ( 2 )( 1 ) | | |
| 7( 6 ) 1 = 7 ( 3 )( 2 ) | | #7 |
| 13( 12 ) 1 = 13 ( 4 )( 3 ) | | #4 |
| 21( 20 ) 1 = 21 ( 5 )( 4 ) | 5 | |
| 31( 30 ) 1 = 31 ( 6 )( 5 ) | | |
| 57( 56 ) 1 = 57 ( 8 )( 7 ) | | |
| 73( 72 ) 1 = 73 ( 9 )( 8 ) | | |
| 91( 90 ) 1 = 91 ( 10 )( 9 ) | | |
| 133(132) 1 = 133 ( 12 )(11 ) | | |

| | | |
|---|---|---|
| 4( 3 ) 2 = 4 ( 3 )( 2 ) | | #4 |
| 7( 6 ) 2 = 7 ( 4 )( 3 ) | 13 | #7 |
| 11( 10 ) 2 = 11 ( 5 )( 4 ) | | |
| 37( 36 ) 2 = 37 ( 9 )( 8 ) | | |

| | | |
|---|---|---|
| 5( 4 ) 3 = 5 ( 4 )( 3 ) | | |
| 11( 10 ) 3 = 11 ( 6 )( 5 ) | 14 | |
| 15( 14 ) 3 = 15 ( 7 )( 6 ) | | #7 |

| | | |
|---|---|---|
| 6( 5 ) 4 = 6 ( 5 )( 4 ) | | |
| 15( 14 ) 4 = 15 ( 8 )( 7 ) | | |
| 19( 18 ) 4 = 19 ( 9 )( 8 ) | 15 | |

| | |
|---|---|
| 7( 6 ) 5 = 7 ( 6 )( 5 ) | |
| 19( 18 ) 5 = 19 ( 10 )( 9 ) | 16 |
| 23( 22 ) 5 = 23 ( 11 )(10 ) | |

| |
|---|
| 8( 7 ) 6 = 8 ( 7 )( 6 ) |
| 23( 22 ) 6 = 23 ( 12 )(11 ) |

EXAMPLES OF MULTI-ROTATIONAL PATTERNS

| |
|---|
| 13( 12 ) 1 = 26 ( 3 )( 2 ) |
| 19( 18 ) 1 = 57 ( 3 )( 2 ) |
| 25( 24 ) 1 = 100 ( 3 )( 2 ) |
| 31( 30 ) 1 = 155 ( 3 )( 2 ) |
| 37( 36 ) 1 = 111 ( 4 )( 3 ) |

| |
|---|
| 16( 15 ) 2 = 80 ( 3 )( 2 ) |
| 19( 18 ) 2 = 57 ( 4 )( 3 ) |
| 31( 30 ) 2 = 93 ( 5 )( 4 ) |

| | |
|---|---|
| 5( 4 ) 3 = 10 ( 3 )( 2 ) | 18 |

EXAMPLES OF OTHER ROTATIONAL PATTERNS

| | | |
|---|---|---|
| 13( 12 ) 2 = 52 ( 3 )( 2 ) | Stars with 4 routes replaced by four stars with 3 Routes | #4 |
| 15( 14 ) 3 = 105 ( 3 )( 2 ) | Stars with 7 routes replaced by seven stars with 3 Routes | #7 |

Fig.12.

| AREAS CHOICES | STARS ROUTES | | | | | | |
|---|---|---|---|---|---|---|---|
| 16 ( 15 ) 2 = | 16 ( 6 )( 5 ) | 22 23 | | | | | |
| 16 ( 15 ) 1 = | 20 ( 4 )( 3 ) | 20 21 | | | | | #4 |
| 12 ( 44 ) 3 = | 44 ( 3 )( 2 ) | 19 | | | | | |
| 10 ( 9 ) 2 = | 15 ( 4 )( 3 ) | 24 | | | | | |
| 8 ( 7 ) 3 = | 14 ( 4 )( 3 ) | 25 | | | | | |
| 6 ( 5 ) 2 = | 10 ( 3 )( 2 ) | 26 | | | | | |
| 9 ( 8 ) 1 = | 12 ( 3 )( 2 ) | 27 28 | A=RxR  S=R(R+1) | R = odd integer | R= 3  A= 9 | S= 12 | |
| 25 ( 24 ) 1 = | 30 ( 5 )( 4 ) | 29 | A=RxR  S=R(R+1) | R = odd integer | R= 5  A= 25 | S= 30 | |
| 49 ( 48 ) 1 = | 56 ( 7 )( 6 ) | 30 | A=RxR  S=R(R+1) | R = odd integer | R= 7  A= 49 | S= 56 | #7 |
| 81 ( 80 ) 1 = | 90 ( 9 )( 8 ) | | A=RxR  S=R(R+1) | R = odd integer | R= 9  A= 81 | S= 90 | |
| 121 (120 ) 1 = | 132 ( 11 )( 10 ) | | A=RxR  S=R(R+1) | R = odd integer | R=11  A=121 | S=132 | |
| 169 (168 ) 1 = | 182 ( 13 )( 12 ) | | A=RxR  S=R(R+1) | R = odd integer | R=13  A=169 | S=182 | |
| 225 (224 ) 1 = | 240 ( 15 )( 14 ) | | A=RxR  S=R(R+1) | R = odd integer | R=15  A=225 | S=240 | |
| 289 (288 ) 1 = | 306 ( 17 )( 16 ) | | A=RxR  S=R(R+1) | R = odd integer | R=17  A=289 | S=306 | |
| 361 (360 ) 1 = | 380 ( 19 )( 18 ) | | A=RxR  S=R(R+1) | R = odd integer | R=19  A=361 | S=380 | |
| etc. | | | | | | | |
| 15 ( 14 ) 1 = | 35 ( 3 )( 2 ) | 31 | Odd number of Groups: each Group = 3 Areas: R=3 | | | | |
| 21 ( 20 ) 1 = | 70 ( 3 )( 2 ) | 32 | Odd number of Groups: each Group = 3 Areas: R=3 | | | | |
| 27 ( 26 ) 1 = | 117 ( 3 )( 2 ) | 33 | Odd number of Groups: each Group = 3 Areas: R=3 | | | | |
| 33 ( 32 ) 1 = | 176 ( 3 )( 2 ) | | Odd number of Groups: each Group = 3 Areas: R=3 | | | | |
| 39 ( 38 ) 1 = | 247 ( 3 )( 2 ) | | Odd number of Groups: each Group = 3 Areas: R=3 | | | | |
| 45 ( 44 ) 1 = | 330 ( 3 )( 2 ) | | Odd number of Groups: each Group = 3 Areas: R=3 | | | | |
| 51 ( 50 ) 1 = | 425 ( 3 )( 2 ) | | Odd number of Groups: each Group = 3 Areas: R=3 | | | | |
| etc. | | | | | | | |
| 16 ( 15 ) 2 = | 80 ( 3 )( 2 ) | | Stars with 4 routes replaced by four stars with 3 Routes | | | | #4 |
| 49 ( 48 ) 1 = | 392 ( 3 )( 2 ) | | Stars with 7 routes replaced by seven stars with 3 Routes | | | | #7 |
| 49 ( 48 ) 2 = | 392 ( 4 )( 3 ) | | Stars with 7 routes replaced by seven stars with 4 Routes | | | | #7 |

Fig. 13.

| AREAS | | | | | | | |
|---|---|---|---|---|---|---|---|
| Twin | 0 | 0 | 0 | 0 | 0 | 0 | 0 |
| STARS | 1 | 2 | 3 | 4 | 5 | 6 | 7 |
| 1 | 1 | 1 | | 1 | | | 1 |
| 2 | 1 | 1 | 1 | | 1 | | |
| 3 | | 1 | 1 | 1 | | 1 | |
| 4 | | | 1 | 1 | 1 | | 1 |
| 5 | 1 | | | 1 | 1 | 1 | |
| 6 | | 1 | | | 1 | 1 | 1 |
| 7 | 1 | | 1 | | | 1 | 1 |

Fig. 14.

| AREAS | | | | | | | | | | > | > |
|---|---|---|---|---|---|---|---|---|---|---|---|
| Triple | 0 | 0 | 0 | 0 | 0 | 0 | 0 | 0 | 0 | 1 | 1 |
| STARS | 1 | 2 | 3 | 4 | 5 | 6 | 7 | 8 | 9 | 0 | 1 |
| 1 | 1 | 1 | 1 | | 1 | 1 | | 1 | | | |
| 2 | 1 | 1 | 1 | | | 1 | 1 | | 1 | | |
| 3 | | 1 | 1 | 1 | | | 1 | 1 | | 1 | |
| 4 | | | 1 | 1 | 1 | | | 1 | 1 | | 1 |
| 5 | 1 | | | 1 | 1 | 1 | | | 1 | 1 | |
| 6 | | 1 | | | 1 | 1 | 1 | | | 1 | 1 |
| 7 | 1 | | 1 | | | 1 | 1 | 1 | | | 1 |
| 8 | 1 | 1 | | 1 | | | 1 | 1 | 1 | | |
| 9 | | 1 | 1 | | 1 | | | 1 | 1 | 1 | |
| 10 | 1 | | 1 | 1 | | 1 | | | 1 | 1 | |
| 11 | 1 | 1 | | 1 | 1 | | 1 | | | | 1 |

Fig. 15.

| AREAS | | | | | | | | | | > | > | > | > | > | > | > | > | > | > |
|---|---|---|---|---|---|---|---|---|---|---|---|---|---|---|---|---|---|---|---|
| Quad | 0 | 0 | 0 | 0 | 0 | 0 | 0 | 0 | 0 | 1 | 1 | 1 | 1 | 1 | 1 | 1 | 1 | 1 | 1 |
| STARS | 1 | 2 | 3 | 4 | 5 | 6 | 7 | 8 | 9 | 0 | 1 | 2 | 3 | 4 | 5 | 6 | 7 | 8 | 9 |
| 1 | 1 | 1 | 1 | 1 | | 1 | | 1 | | | 1 | 1 | | 1 | | | | | |
| 2 | | 1 | 1 | 1 | 1 | | 1 | | 1 | | | 1 | 1 | | 1 | | | | |
| 3 | | | 1 | 1 | 1 | 1 | | 1 | | 1 | | | 1 | 1 | | 1 | | | |
| 4 | 1 | | | 1 | 1 | 1 | 1 | | 1 | | 1 | | | 1 | 1 | | 1 | | |
| 5 | | 1 | | | 1 | 1 | 1 | 1 | | 1 | | 1 | | | 1 | 1 | | 1 | |
| 6 | | | 1 | | | 1 | 1 | 1 | 1 | | 1 | | 1 | | | 1 | 1 | | 1 |
| 7 | 1 | | | 1 | | | 1 | 1 | 1 | 1 | | 1 | | 1 | | | 1 | 1 | |
| 8 | 1 | 1 | | | 1 | | | 1 | 1 | 1 | 1 | | 1 | | 1 | | | 1 | |
| 9 | | 1 | 1 | | | 1 | | | 1 | 1 | 1 | 1 | | 1 | | 1 | | | |
| 10 | | | 1 | 1 | | | 1 | | | 1 | 1 | 1 | 1 | | 1 | | 1 | | |
| 11 | | | | 1 | 1 | | | 1 | | | 1 | 1 | 1 | 1 | | 1 | | 1 | |
| 12 | | | | | 1 | 1 | | | 1 | | | 1 | 1 | 1 | 1 | | 1 | | 1 |
| 13 | 1 | | | | | 1 | 1 | | | 1 | | | 1 | 1 | 1 | 1 | | 1 | |
| 14 | | 1 | | | | | 1 | 1 | | | 1 | | | 1 | 1 | 1 | 1 | | 1 |
| 15 | 1 | | 1 | | | | | 1 | 1 | | | 1 | | | 1 | 1 | 1 | 1 | |
| 16 | | 1 | | 1 | | | | | 1 | 1 | | | 1 | | | 1 | 1 | 1 | 1 |
| 17 | 1 | | 1 | | 1 | | | | | 1 | 1 | | | 1 | | | 1 | 1 | 1 |
| 18 | 1 | 1 | | 1 | | 1 | | | | | 1 | 1 | | | 1 | | | 1 | 1 |
| 19 | 1 | 1 | 1 | | 1 | | 1 | | | | | 1 | 1 | | | 1 | | | 1 |

Fig. 16.

| AREAS | | | | | | | | | | > | > | > | > | > | > | > | > | > | > |
|---|---|---|---|---|---|---|---|---|---|---|---|---|---|---|---|---|---|---|---|
| Quin | 0 | 0 | 0 | 0 | 0 | 0 | 0 | 0 | 0 | 1 | 1 | 1 | 1 | 1 | 1 | 1 | 1 | 1 | 1 |
| STARS | 1 | 2 | 3 | 4 | 5 | 6 | 7 | 8 | 9 | 0 | 1 | 2 | 3 | 4 | 5 | 6 | 7 | 8 | 9 |
| 1 | 1 | 1 | 1 | 1 | | 1 | | 1 | | | 1 | 1 | | 1 | 1 | | | | |
| 2 | | 1 | 1 | 1 | 1 | | 1 | | 1 | | | 1 | 1 | | 1 | 1 | | | |
| 3 | | | 1 | 1 | 1 | 1 | | 1 | | 1 | | | 1 | 1 | | 1 | 1 | | |
| 4 | 1 | | | 1 | 1 | 1 | 1 | | 1 | | 1 | | | 1 | 1 | | 1 | 1 | |
| 5 | 1 | 1 | | | 1 | 1 | 1 | 1 | | 1 | | 1 | | | 1 | 1 | | 1 | 1 |
| 6 | | 1 | 1 | | | 1 | 1 | 1 | 1 | | 1 | | 1 | | | 1 | 1 | | 1 |
| 7 | 1 | | 1 | 1 | | | 1 | 1 | 1 | 1 | | 1 | | 1 | | | 1 | 1 | |
| 8 | 1 | 1 | | 1 | 1 | | | 1 | 1 | 1 | 1 | | 1 | | 1 | | | 1 | 1 |
| 9 | | 1 | 1 | | 1 | 1 | | | 1 | 1 | 1 | 1 | | 1 | | 1 | | | 1 |
| 10 | | | 1 | 1 | | 1 | 1 | | | 1 | 1 | 1 | 1 | | 1 | | 1 | | |
| 11 | | | | 1 | 1 | | 1 | 1 | | | 1 | 1 | 1 | 1 | | 1 | | 1 | |
| 12 | | | | | 1 | 1 | | 1 | 1 | | | 1 | 1 | 1 | 1 | | 1 | | 1 |
| 13 | 1 | | | | | 1 | 1 | | 1 | 1 | | | 1 | 1 | 1 | 1 | | 1 | |
| 14 | | 1 | | | | | 1 | 1 | | 1 | 1 | | | 1 | 1 | 1 | 1 | | 1 |
| 15 | 1 | | 1 | | | | | 1 | 1 | | 1 | 1 | | | 1 | 1 | 1 | 1 | |
| 16 | | 1 | | 1 | | | | | 1 | 1 | | 1 | 1 | | | 1 | 1 | 1 | 1 |
| 17 | 1 | | 1 | | 1 | | | | | 1 | 1 | | 1 | 1 | | | 1 | 1 | 1 |
| 18 | 1 | 1 | | 1 | | 1 | | | | | 1 | 1 | | 1 | 1 | | | 1 | 1 |
| 19 | 1 | 1 | 1 | | 1 | | 1 | | | | | 1 | 1 | | 1 | 1 | | | 1 |

Fig. 18.

| Triple | A | R | E | A | S |
|---|---|---|---|---|---|
| | 0 | 0 | 0 | 0 | 0 |
| STARS | 1 | 2 | 3 | 4 | 5 |
| 1 | 1 | 1 | 1 | | |
| 2 | | 1 | 1 | 1 | |
| 3 | | | 1 | 1 | 1 |
| 4 | 1 | | | 1 | 1 |
| 5 | 1 | 1 | | | 1 |
| 6 | 1 | 1 | 1 | | |
| 7 | | 1 | 1 | | 1 |
| 8 | 1 | | 1 | 1 | |
| 9 | | 1 | | 1 | 1 |
| 10 | 1 | | 1 | | 1 |

Fig. 19.

| Twin | A | R | E | A | S | > | > | > | > | > | > | > |
|---|---|---|---|---|---|---|---|---|---|---|---|---|
| | 0 | 0 | 0 | 0 | 0 | 0 | 0 | 0 | 0 | 1 | 1 | 1 |
| STARS | 1 | 2 | 3 | 4 | 5 | 6 | 7 | 8 | 9 | 0 | 1 | 2 |
| 1 | 1 | 1 | | | | | | | | | | 1 |
| 2 | 1 | 1 | 1 | | | | | | | | | |
| 3 | 1 | | 1 | 1 | | | | | | | | |
| 4 | 1 | | | 1 | 1 | | | | | | | |
| 5 | 1 | | | | 1 | 1 | | | | | | |
| 6 | 1 | | | | | 1 | 1 | | | | | |
| 7 | 1 | | | | | | 1 | 1 | | | | |
| 8 | 1 | | | | | | | 1 | 1 | | | |
| 9 | 1 | | | | | | | | 1 | 1 | | |
| 10 | 1 | | | | | | | | | 1 | 1 | |
| 11 | 1 | | | | | | | | | | 1 | 1 |
| 12 | | 1 | | 1 | | | | | | | | 1 |
| 13 | | 1 | 1 | | 1 | | | | | | | |
| 14 | | | 1 | 1 | | 1 | | | | | | |
| 15 | | | | 1 | 1 | | 1 | | | | | |
| 16 | | | | | 1 | 1 | | 1 | | | | |
| 17 | | | | | | 1 | 1 | | 1 | | | |
| 18 | | | | | | | 1 | 1 | | 1 | | |
| 19 | | | | | | | | 1 | 1 | | | 1 |
| 20 | | 1 | | | | | | | 1 | 1 | | |
| 21 | | | 1 | | | | | | | 1 | 1 | |
| 22 | | | | 1 | | | | | | | 1 | 1 |
| 23 | | 1 | | 1 | | | 1 | | | | | |
| 24 | | | 1 | | 1 | | | 1 | | | | |
| 25 | | | | 1 | | 1 | | | 1 | | | |
| 26 | | | | | 1 | | 1 | | | 1 | | |
| 27 | | | | | | 1 | | 1 | | | 1 | |
| 28 | | | | | | | 1 | | 1 | | | 1 |
| 29 | | 1 | | | | | | 1 | | 1 | | |
| 30 | | | 1 | | | | | | | 1 | 1 | |
| 31 | | | | 1 | | | | | | | 1 | 1 |
| 32 | | 1 | | 1 | | | | | | | 1 | |
| 33 | | | 1 | | 1 | | | | | | | 1 |
| 34 | | 1 | 1 | | | 1 | | | | | | |
| 35 | | | 1 | 1 | | | 1 | | | | | |
| 36 | | | | 1 | 1 | | | 1 | | | | |
| 37 | | | | | 1 | 1 | | | 1 | | | |
| 38 | | | | | | 1 | 1 | | | | | 1 |
| 39 | | 1 | | | | | 1 | 1 | | | | |
| 40 | | | 1 | | | | | 1 | 1 | | | |
| 41 | | | | 1 | | | | | | 1 | 1 | |
| 42 | | | | | 1 | | | | | 1 | 1 | |
| 43 | 1 | | | 1 | | | | | | | 1 | |
| 44 | | 1 | | | 1 | | | | | | | 1 |

| Twin | AREAS > > > > |
|---|---|
| | 0 0 0 0 0 0 0 0 0 1 |

| STARS | 1 | 2 | 3 | 4 | 5 | 6 | 7 | 8 | 9 | 0 |
|---|---|---|---|---|---|---|---|---|---|---|
| 1  | 1 |   | 1 | 1 |   | 1 |   |   |   |   |
| 2  | 1 | 1 |   | 1 | 1 |   |   |   |   |   |
| 3  |   | 1 | 1 |   | 1 | 1 |   |   |   |   |
| 4  |   |   |   | 1 | 1 | 1 |   | 1 |   |   |
| 5  |   |   | 1 | 1 |   | 1 | 1 |   |   |   |
| 6  |   |   |   | 1 | 1 |   | 1 | 1 |   |   |
| 7  | 1 |   | 1 |   |   |   | 1 |   | 1 |   |
| 8  | 1 | 1 |   |   |   |   | 1 | 1 |   |   |
| 9  |   | 1 | 1 |   |   |   |   | 1 | 1 |   |
| 10 | 1 |   |   |   | 1 |   |   |   | 1 | 1 |
| 11 |   | 1 |   |   | 1 | 1 |   |   |   | 1 |
| 12 |   | 1 | 1 |   |   |   |   | 1 |   | 1 |
| 13 | 1 |   |   |   |   | 1 |   | 1 |   | 1 |
| 14 |   | 1 |   | 1 |   |   |   |   | 1 | 1 |
| 15 |   | 1 |   | 1 |   | 1 |   |   |   | 1 |

Fig.25.

| Triple | AREAS > > |
|---|---|
| | 0 0 0 0 0 0 0 0 |

| STARS | 1 | 2 | 3 | 4 | 5 | 6 | 7 | 8 |
|---|---|---|---|---|---|---|---|---|
| 1  | 1 | 1 |   |   | 1 | 1 |   |   |
| 2  |   | 1 | 1 |   |   | 1 | 1 |   |
| 3  |   |   | 1 | 1 |   |   | 1 | 1 |
| 4  | 1 |   |   | 1 | 1 |   |   | 1 |
| 5  | 1 |   | 1 |   | 1 |   | 1 |   |
| 6  |   | 1 |   | 1 |   | 1 |   | 1 |
| 7  | 1 | 1 |   |   |   |   | 1 | 1 |
| 8  |   | 1 | 1 |   | 1 |   |   | 1 |
| 9  |   |   | 1 | 1 | 1 | 1 |   |   |
| 10 | 1 |   |   | 1 |   | 1 | 1 |   |
| 11 | 1 |   |   |   | 1 | 1 |   | 1 |
| 12 |   | 1 |   | 1 | 1 | 1 |   |   |
| 13 | 1 | 1 | 1 | 1 |   |   |   |   |
| 14 |   |   |   |   | 1 | 1 | 1 | 1 |

Fig.26.

| Twin | AREAS |
|---|---|
| | 0 0 0 0 0 0 |

| STARS | 1 | 2 | 3 | 4 | 5 | 6 |
|---|---|---|---|---|---|---|
| 1  | 1 | 1 |   |   |   | 1 |
| 2  | 1 | 1 | 1 |   |   |   |
| 3  | 1 |   | 1 | 1 |   |   |
| 4  | 1 |   |   | 1 | 1 |   |
| 5  | 1 |   |   |   | 1 | 1 |
| 6  |   | 1 |   | 1 |   | 1 |
| 7  |   | 1 | 1 |   | 1 |   |
| 8  |   |   | 1 | 1 |   | 1 |
| 9  |   | 1 |   | 1 | 1 |   |
| 10 |   |   | 1 |   | 1 | 1 |

Fig.27.

| Single | AREAS > > > |
|---|---|
| | 0 0 0 0 0 0 0 0 0 |

| STARS | 1 | 2 | 3 | 4 | 5 | 6 | 7 | 8 | 9 |
|---|---|---|---|---|---|---|---|---|---|
| 1  | 1 | 1 | 1 |   |   |   |   |   |   |
| 2  |   |   |   | 1 | 1 | 1 |   |   |   |
| 3  |   |   |   |   |   |   | 1 | 1 | 1 |
| 4  | 1 |   |   | 1 |   |   | 1 |   |   |
| 5  | 1 |   |   |   | 1 |   | 1 |   |   |
| 6  |   | 1 |   | 1 |   |   |   | 1 |   |
| 7  |   | 1 |   |   | 1 |   |   |   | 1 |
| 8  |   | 1 |   |   |   | 1 |   | 1 |   |
| 9  |   |   | 1 | 1 |   |   |   | 1 |   |
| 10 |   |   | 1 |   | 1 | 1 |   |   |   |
| 11 |   |   | 1 |   |   |   |   |   | 1 |
| 12 | 1 |   |   |   |   | 1 |   |   | 1 |

Fig.28.

| Single | AREAS > > > |
|---|---|
| | 0 0 0 0 0 0 0 0 0 |

| STARS | 1 | 2 | 3 | 4 | 5 | 6 | 7 | 8 | 9 |
|---|---|---|---|---|---|---|---|---|---|
| 1  | 1 |   |   | 1 |   |   | 1 |   |   |
| 2  |   | 1 |   |   | 1 |   |   | 1 |   |
| 3  |   |   | 1 |   |   | 1 |   |   | 1 |
| 4  |   | 1 | 1 |   |   |   | 1 |   |   |
| 5  | 1 |   |   |   | 1 |   |   |   | 1 |
| 6  |   | 1 |   |   |   | 1 | 1 |   |   |
| 7  |   |   |   | 1 | 1 |   | 1 |   |   |
| 8  | 1 |   |   |   |   | 1 |   | 1 |   |
| 9  |   | 1 | 1 |   |   |   |   |   | 1 |
| 10 | 1 | 1 | 1 |   |   |   |   |   |   |
| 11 |   |   |   | 1 | 1 | 1 |   |   |   |
| 12 |   |   |   |   |   |   | 1 | 1 | 1 |

Fig. 29.

| AREAS → | 0 | 0 | 0 | 0 | 0 | 0 | 0 | 0 | 0 | 1 | 1 | 1 | 1 | 1 | 1 | 1 | 1 | 1 | 1 | 2 | 2 | 2 | 2 | 2 | 2 |
|---|---|---|---|---|---|---|---|---|---|---|---|---|---|---|---|---|---|---|---|---|---|---|---|---|---|
| Single | | | | | | | | | | | | | | | | | | | | | | | | | |
| STARS | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 |
| 1 | 1 | | | | 1 | | | | | 1 | | | | | 1 | | | | | 1 | | | | | |
| 2 | | 1 | | | | 1 | | | | | 1 | | | | | 1 | | | | | 1 | | | | |
| 3 | | | 1 | | | | 1 | | | | | 1 | | | | | 1 | | | | | 1 | | | |
| 4 | | | | 1 | | | | 1 | | | | | 1 | | | | | 1 | | | | | 1 | | |
| 5 | | | | | 1 | | | | 1 | | | | | 1 | | | | | 1 | | | | | 1 | |
| 6 | | | | 1 | 1 | | | | | 1 | | | | | 1 | | | | | 1 | | | | | 1 |
| 7 | 1 | | | | 1 | | | | | 1 | | | | | 1 | | | | | 1 | | | | | 1 |
| 8 | | 1 | | | | 1 | | | | | 1 | | | | | 1 | | | 1 | 1 | | | | | |
| 9 | | | 1 | | | | 1 | | | | | 1 | | | 1 | 1 | | | | | 1 | | | | |
| 10 | | | | 1 | | | | 1 | | | | | 1 | 1 | | | | 1 | | | | 1 | | | |
| 11 | | 1 | | | | 1 | | | 1 | | 1 | | | | | | 1 | | | | | | | | 1 |
| 12 | | | 1 | | | | 1 | | | 1 | 1 | | | | | | 1 | | 1 | | | | | | |
| 13 | | | | 1 | 1 | | | | | 1 | | | | 1 | | | | | 1 | 1 | | | | | |
| 14 | | | | | 1 | 1 | | | | | | | 1 | | 1 | | | | | | | 1 | | | |
| 15 | 1 | | | | | 1 | | | | | | 1 | | 1 | | | | | | | | | 1 | | |
| 16 | | 1 | | | | | 1 | | | 1 | | | 1 | | | | | | | | | | 1 | | |
| 17 | | | 1 | | 1 | | | | | | 1 | | | 1 | | | | | | | | | | | 1 |
| 18 | | | | 1 | | 1 | | | | | | 1 | | | 1 | | | 1 | | | 1 | | | | |
| 19 | | | | | 1 | | | | 1 | | | | 1 | | | 1 | | | | 1 | | | | | |
| 20 | 1 | | | | | | 1 | | | 1 | | | | | | | 1 | | | 1 | | | | | |
| 21 | | | | 1 | | | 1 | | | | 1 | | | | 1 | | | | 1 | | | | | | |
| 22 | 1 | | | | | 1 | | | | | 1 | | | | 1 | | | | | 1 | | | | | |
| 23 | | 1 | | | 1 | | | | | | | | 1 | | | 1 | | | | | 1 | | | | |
| 24 | | | 1 | | | 1 | | | 1 | | | | | | | | 1 | | | | | | 1 | | |
| 25 | | | | 1 | | | 1 | | | 1 | | | | | 1 | | | | | | | | | | 1 |
| 26 | 1 | 1 | 1 | 1 | 1 | | | | | | | | | | | | | | | | | | | | |
| 27 | | | | | | 1 | 1 | 1 | 1 | 1 | | | | | | | | | | | | | | | |
| 28 | | | | | | | | | | | 1 | 1 | 1 | 1 | 1 | | | | | | | | | | |
| 29 | | | | | | | | | | | | | | | | 1 | 1 | 1 | 1 | 1 | | | | | |
| 30 | | | | | | | | | | | | | | | | | | | | | 1 | 1 | 1 | 1 | 1 |

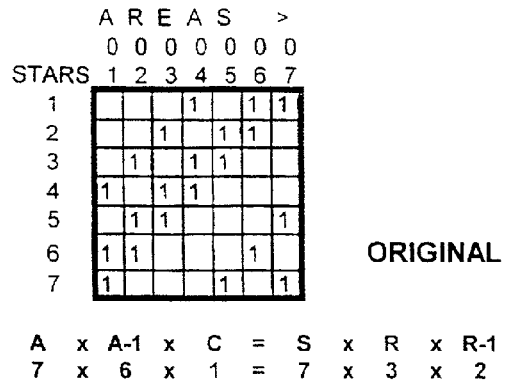
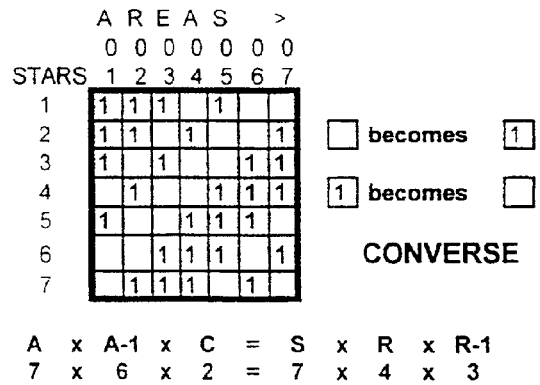
Figure 37
Figure 38
Figure 39
Figure 40
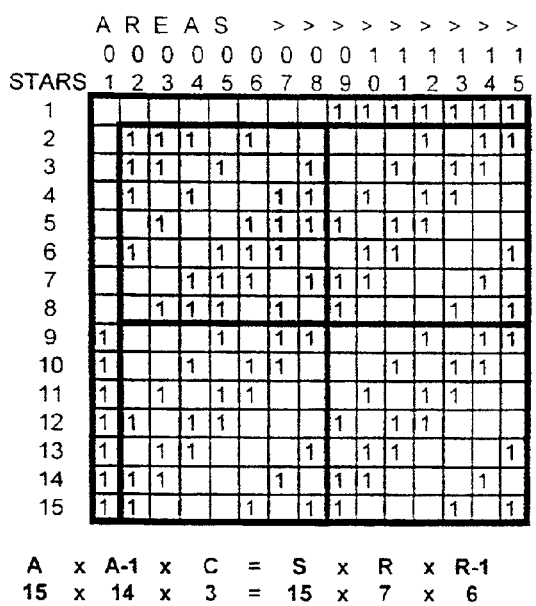
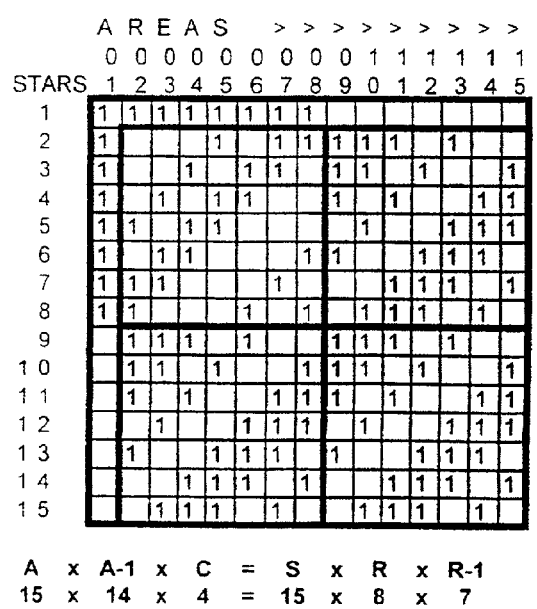

ORIGINAL

CONVERSE

| TIME SLOT | LINE NUMBER 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | 5 | 4 | 3 | 2 | 1 | 0 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 |
| 1 | 10 | 9 | 8 | 7 | 6 | 5 | 4 | 3 | 2 | 1 | 0 | 62 | 61 | 60 | 59 | 58 | 57 | 56 | 55 | 54 | 53 | 52 | 51 | 50 | 49 | 48 | 47 | 46 | 45 | 44 | 43 |
| 2 | 11 | 10 | 9 | 8 | 7 | 6 | 5 | 4 | 3 | 2 | 1 | 0 | 62 | 61 | 60 | 59 | 58 | 57 | 56 | 55 | 54 | 53 | 52 | 51 | 50 | 49 | 48 | 47 | 46 | 45 | 44 |
| 3 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 | 55 | 54 | 53 | 52 | 51 | 50 | 49 | 48 |
| 4 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 | 55 | 54 | 53 | 52 | 51 | 50 |
| 5 | 20 | 19 | 18 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 | 55 | 54 | 53 |
| 6 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 | 55 | 54 |
| 7 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 | 55 |
| 8 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 | 57 | 56 |
| 9 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 62 | 61 | 60 | 59 | 58 |
| 10 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | 62 |
| 11 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 12 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| 13 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 |
| 14 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 |
| 15 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 |
| 16 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 |
| 17 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 |
| 18 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 |
| 19 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 |
| 20 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 |
| 21 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 |
| 22 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 | 20 |
| 23 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 | 21 |
| 24 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 | 23 | 22 |
| 25 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 | 25 | 24 |
| 26 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 | 27 | 26 |
| 27 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 | 28 |
| 28 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 | 29 |
| 29 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 | 30 |
| 30 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | 31 |
| 31 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 |

//
NETWORK INTERCONNECTIONS

The interconnection of nodes within a network can be limited by a number of physical aspects, which can totally prevent some topologies, or make other topologies comparatively inefficient. Multistage networks are a way of building large networks from nodes of limited capability, but restricting the number of stages traversed to a minimum is a very desirable goal.

It is desirable in practical multistage networks, particularly where the nodes are on different geographical sites, to restrict the total number of interconnection routes to any node.

Fully-interconnected 3-stage networks have a large CHOICE of ROUTEs which can cause considerable searching difficulties. A fully-interconnected network is shown in FIG. 1, where 7 Area Nodes are fully connected via 7 STAR Nodes. Partially Interconnected Networks which have a smaller, but fixed, choice in the number of routes between all the nodes that wish to be interconnected, are of considerable benefit for the implementation of practically dimensioned networks.

According to the present invention there is provided a partially interconnected network comprising a plurality of Allocated Nodes, which Allocated Nodes are each allocated to one of a number of AREAS, and further comprising a plurality of STAR Nodes (STARs), and also comprising point to point interconnections between the Allocated Nodes and the STAR Nodes, where the number of AREAs with Allocated Nodes connected to an individual STAR forms the number of ROUTEs from an individual STAR, the Allocated Nodes of a first of the AREAs being connected to a set comprising some, but not all, of the STAR Nodes, and wherein further of the AREAs are similarly connected to further sets each comprising STAR Nodes and where there is at least one connection choice (CHOICE) between any two Allocated Nodes in different AREAs and where a connection route comprises two point to point interconnections connected in series by a STAR Node.

The present invention will now be described by way of example, with reference to the accompanying drawings, in which, FIG. 1 shows a schematic diagram of a fully-interconnected network;

FIG. 5 shows the connections in the diagram of FIG. 4 in tabular form;

FIG. 7 shows the connections of a counter rotational version of FIG. 5 in tabular form;

FIG. 8 shows the example of FIG. 5 where the AREAs and STARs have been reordered;

Figure 17:
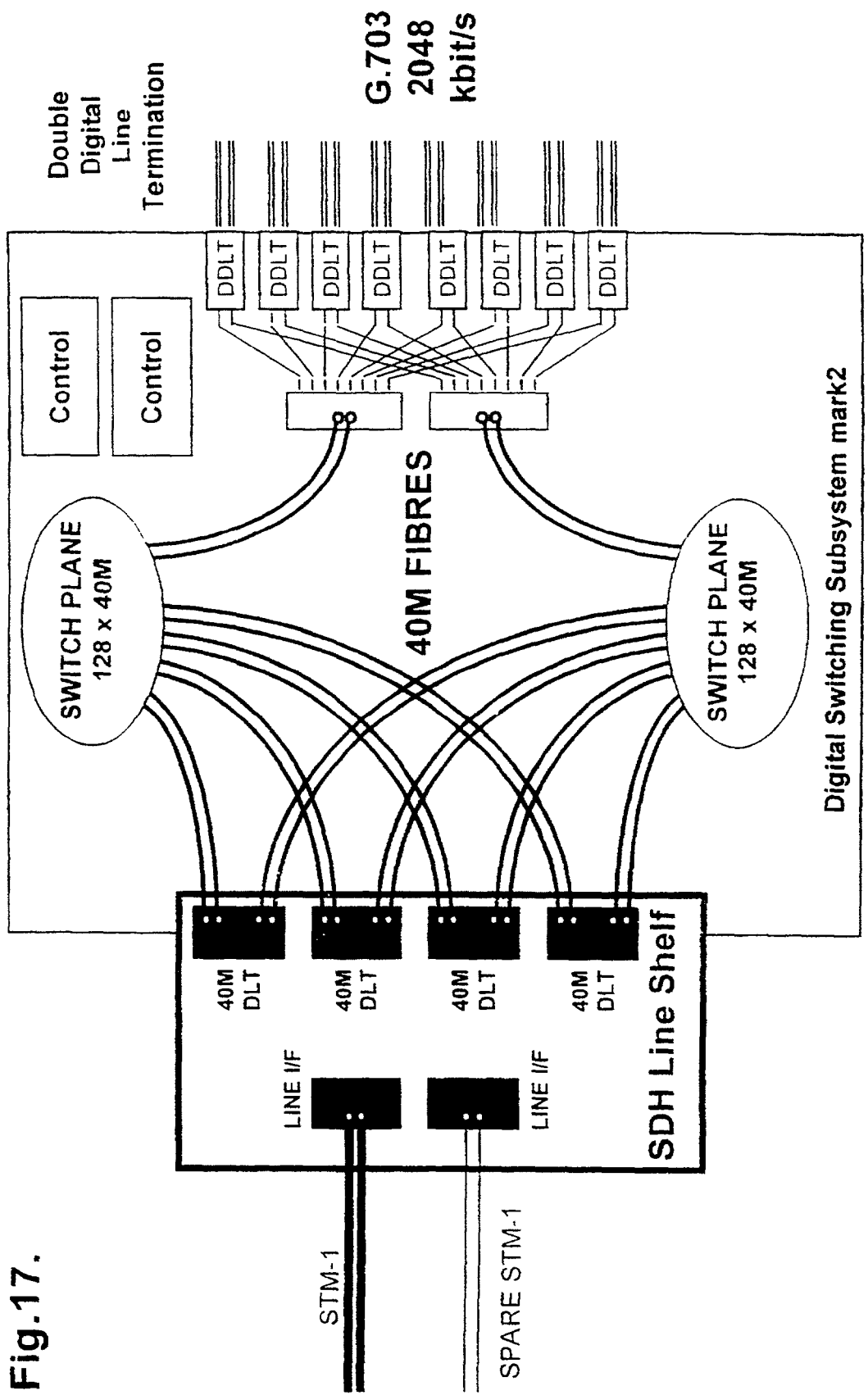

FIG. 11 lists examples of Rotational Patterns;

FIG. 12 lists examples of Other Patterns;

FIG. 13 shows an example of a twin choice pattern;

FIG. 14 shows an example of a triple choice pattern;

FIG. 15 shows an example of a quad choice pattern;

FIG. 16 shows an example of a quin choice pattern;

FIG. 17 shows a network using SDH interfaces on DSS mk2;

FIG. 18 shows an example of a Multi-Rotational Pattern;

FIG. 19 shows an Asymmetric Twin CHOICE network;

Figures 20, 21, 22, 23:
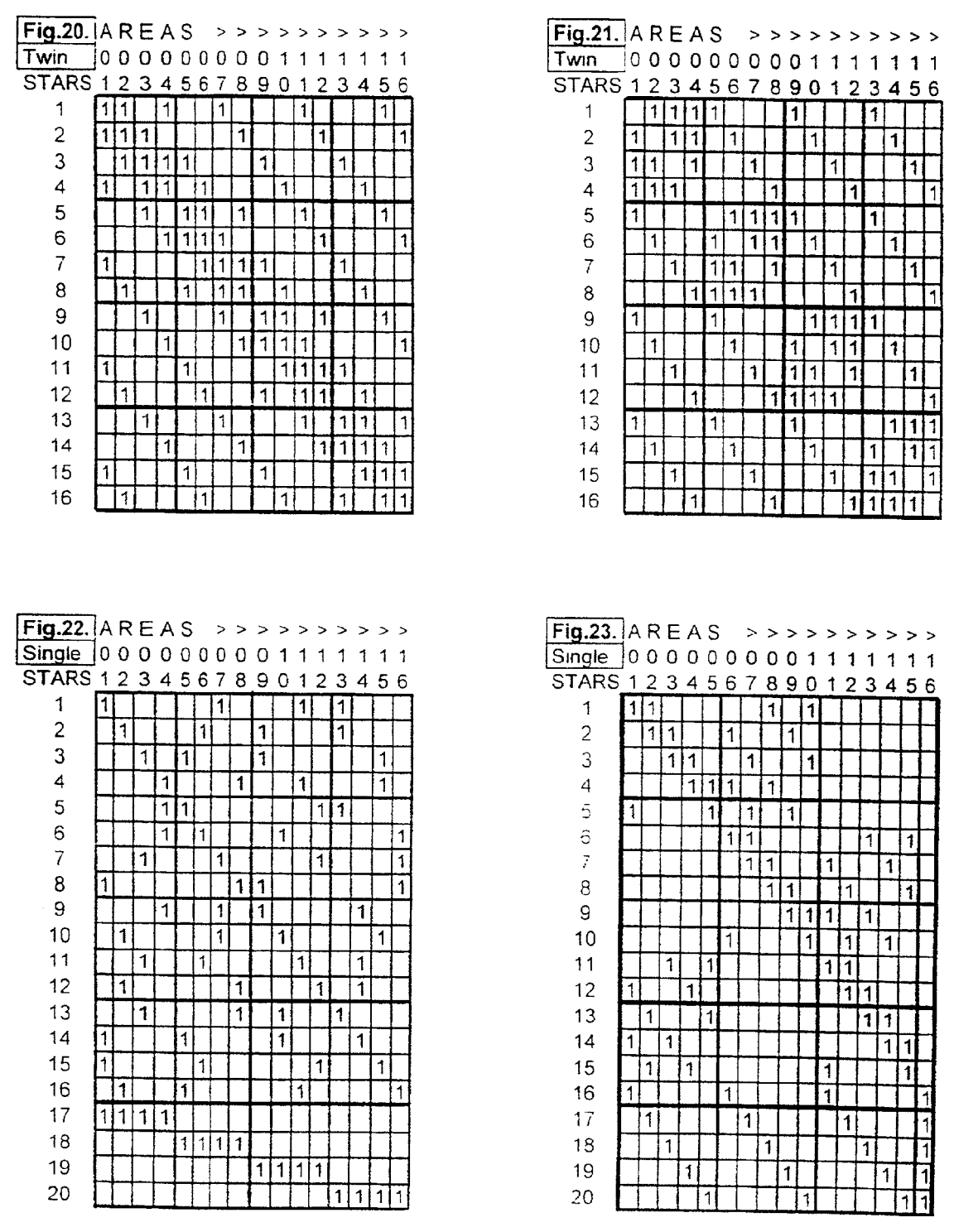

FIG. 20 shows a Symmetrical Twin CHOICE Pattern;

FIG. 21 shows a re-ordered example of a Symmetrical Twin CHOICE Pattern;

FIG. 22 shows an Equally Grouped Asymmetric single CHOICE Pattern

FIG. 23 shows an Unequally Grouped Asymmetric single CHOICE Pattern;

FIG. 24 shows an Asymmetric Twin CHOICE network for 10 AREAs;

FIG. 25 shows an Asymmetric Triple CHOICE network for 8 AREAS;

FIG. 26 shows an Asymmetric Twin CHOICE network

FIG. 27 shows a Single CHOICE Asymmetric Pattern using 3-pointed STARs;

FIG. 28 shows a Single CHOICE Asymmetric Pattern based on an odd square;

FIG. 29 shows a 30 AREA Single CHOICE network using 5-pointed STARs;

Figure 30:
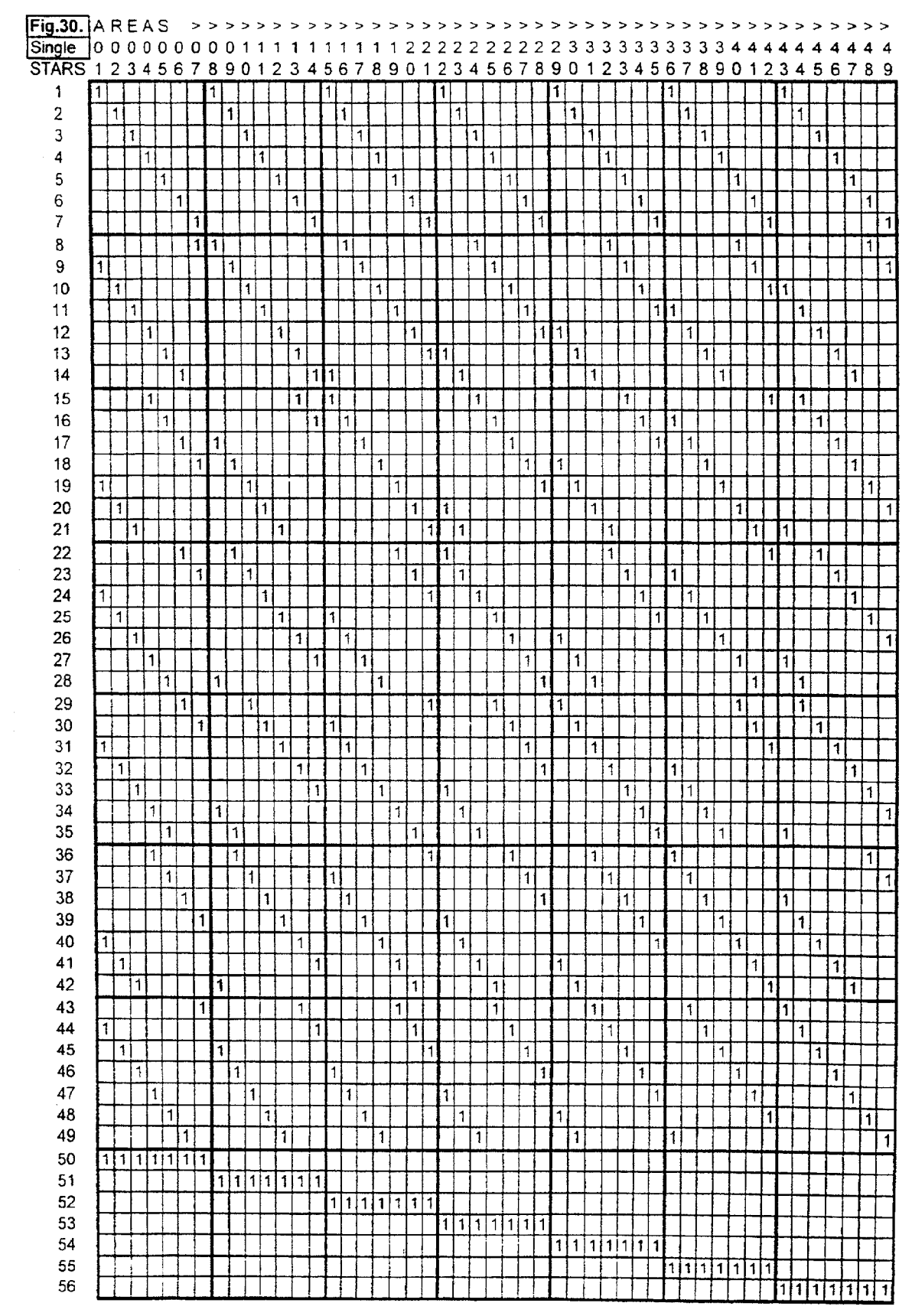

FIG. 30 shows a 56 AREA Single CHOICE network using 7-pointed STARs

Figure 31:
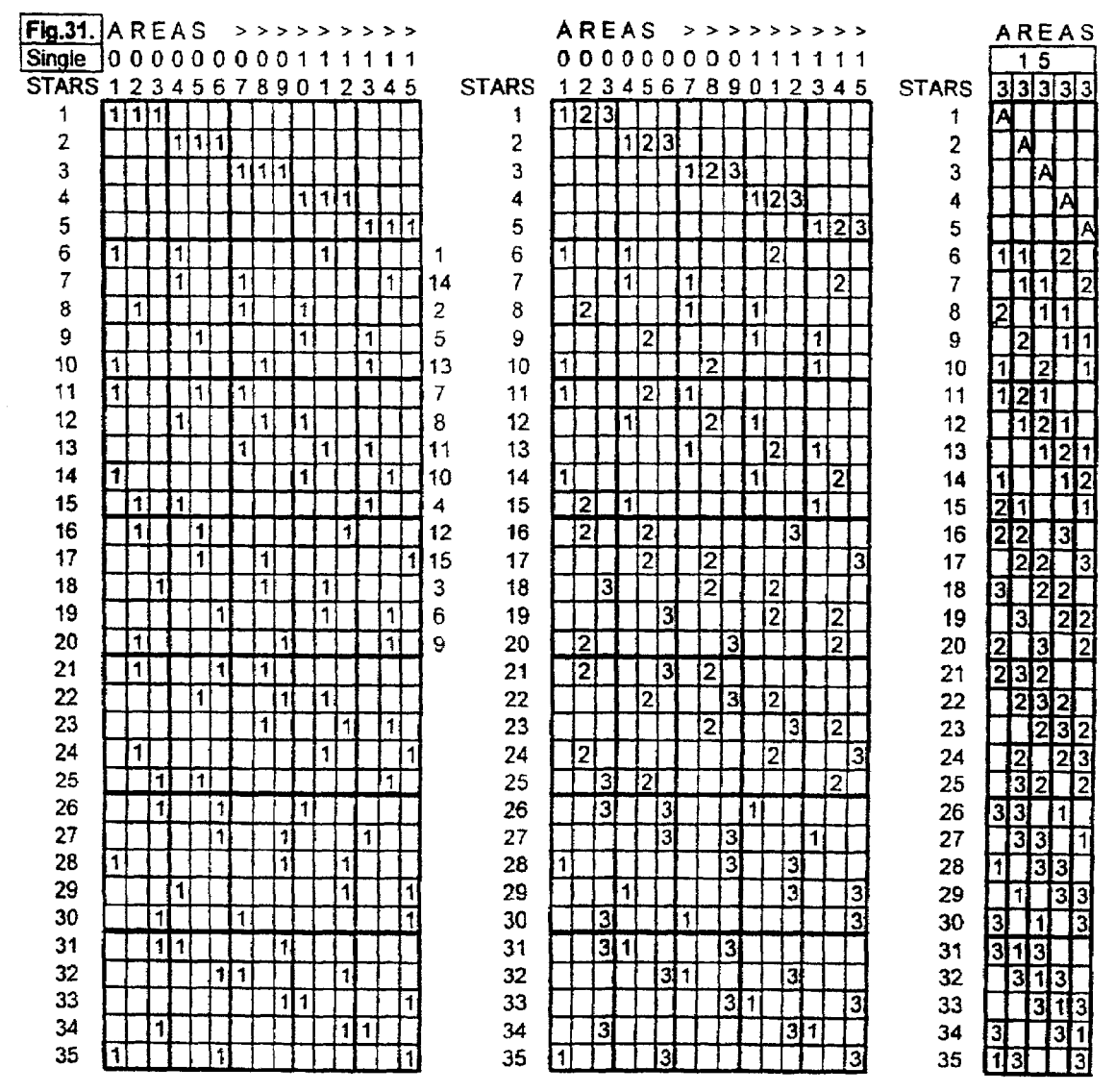
Figure 34:
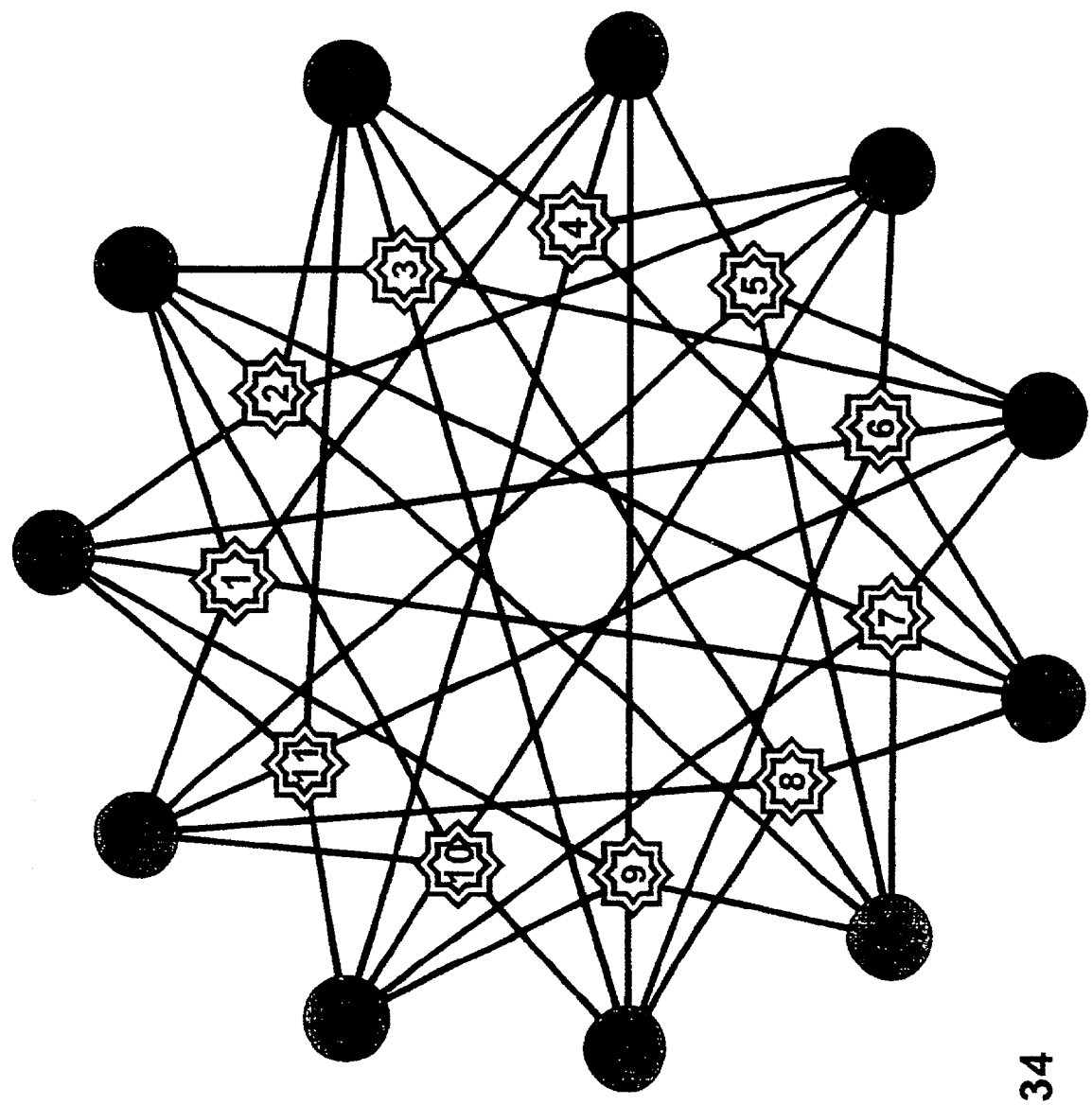
Figure 35:
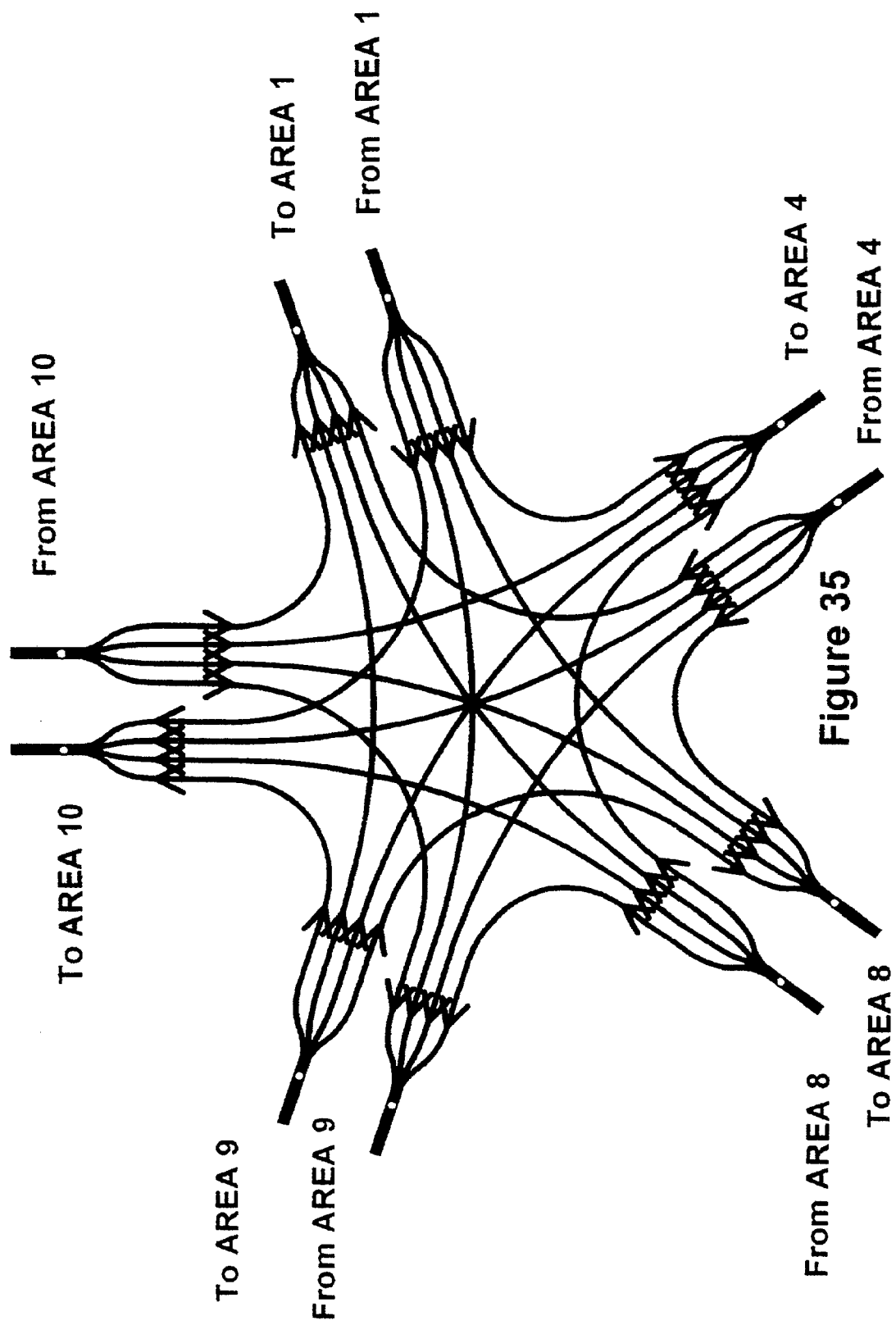
Figure 36:
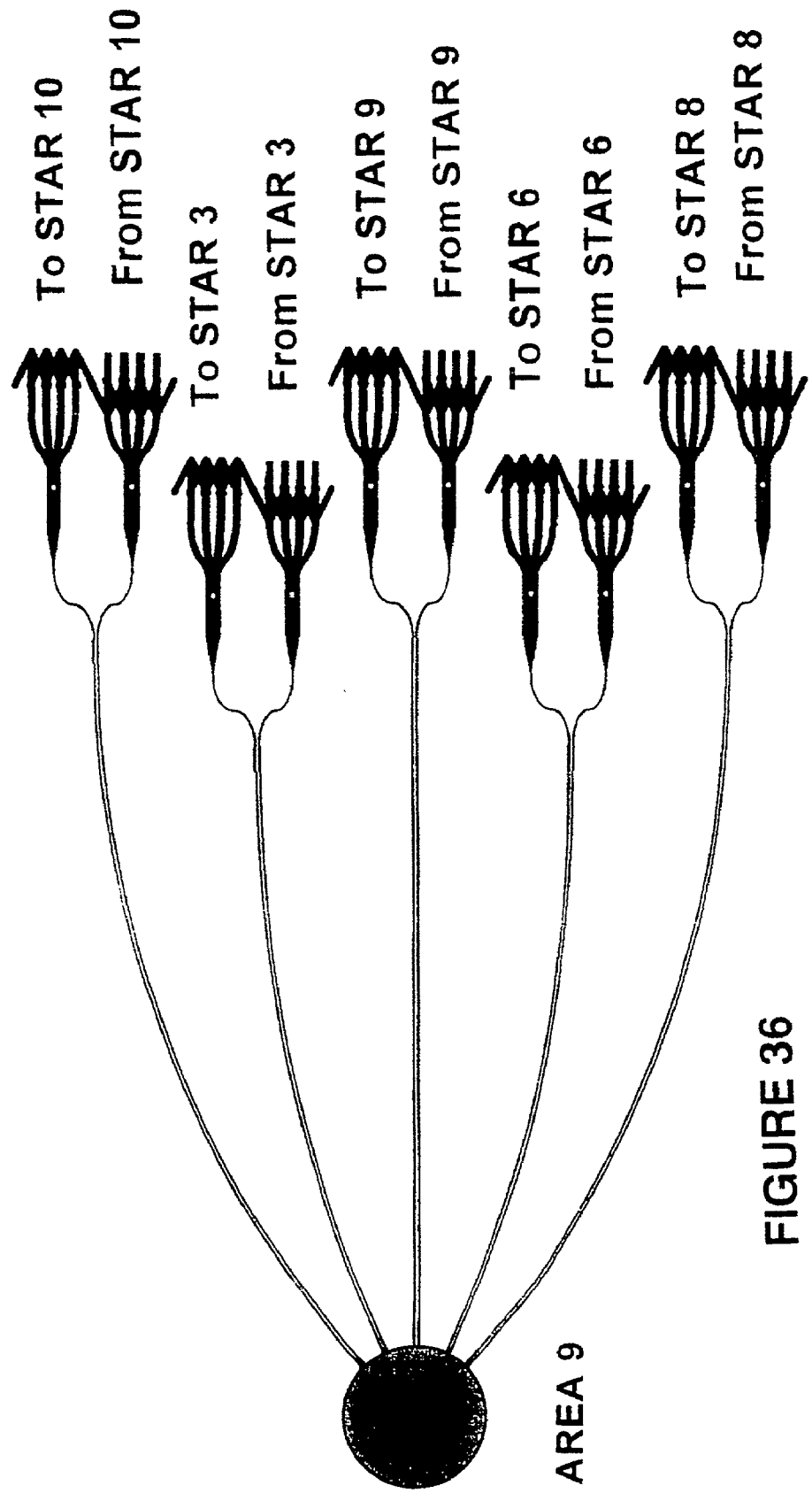
Figure 43:
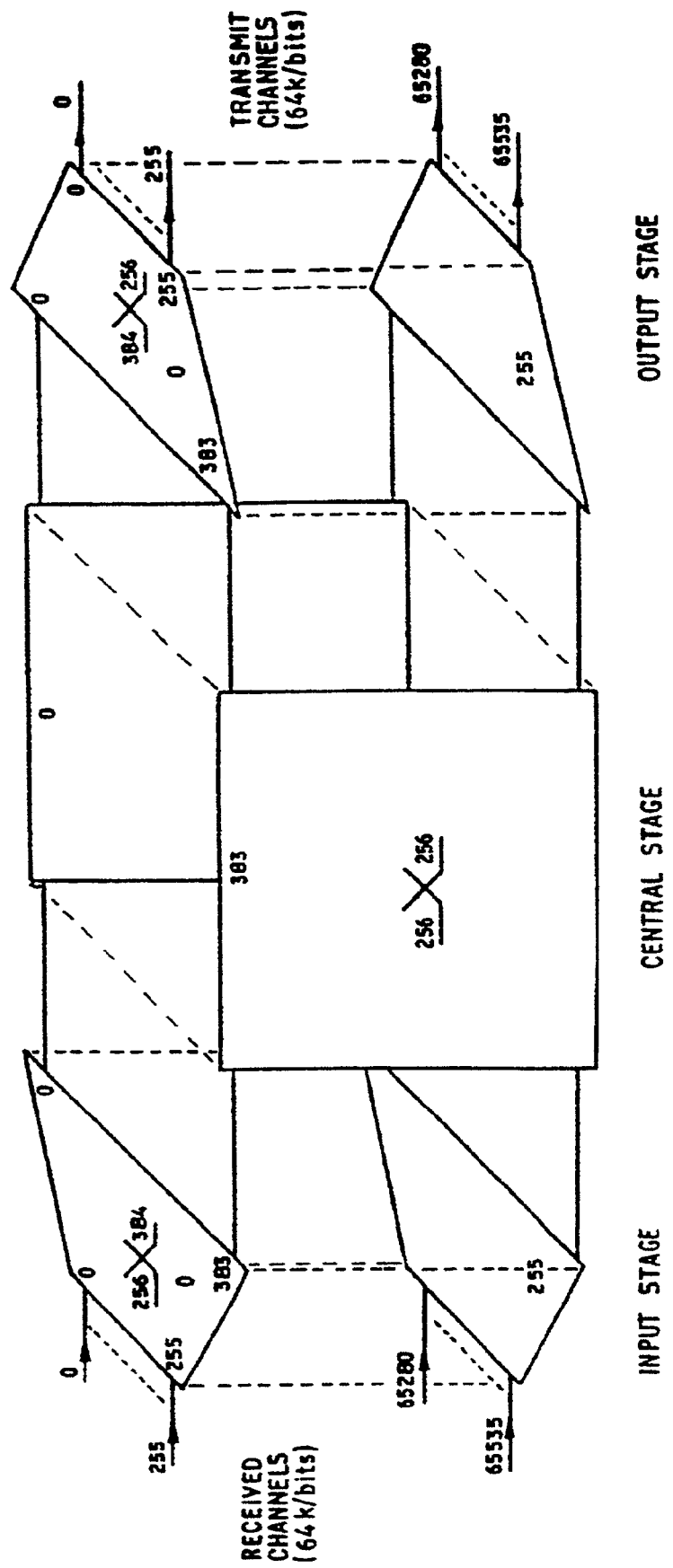
Figure 44:
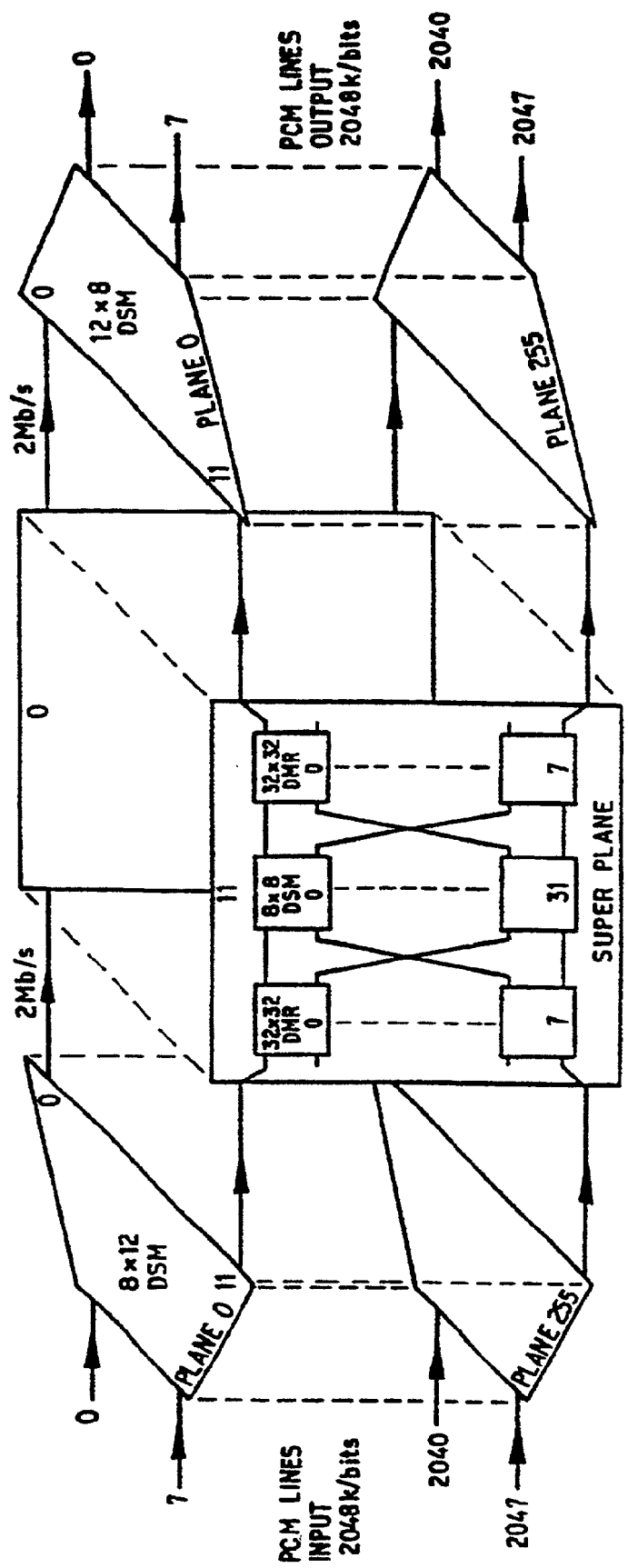
Figure 46:
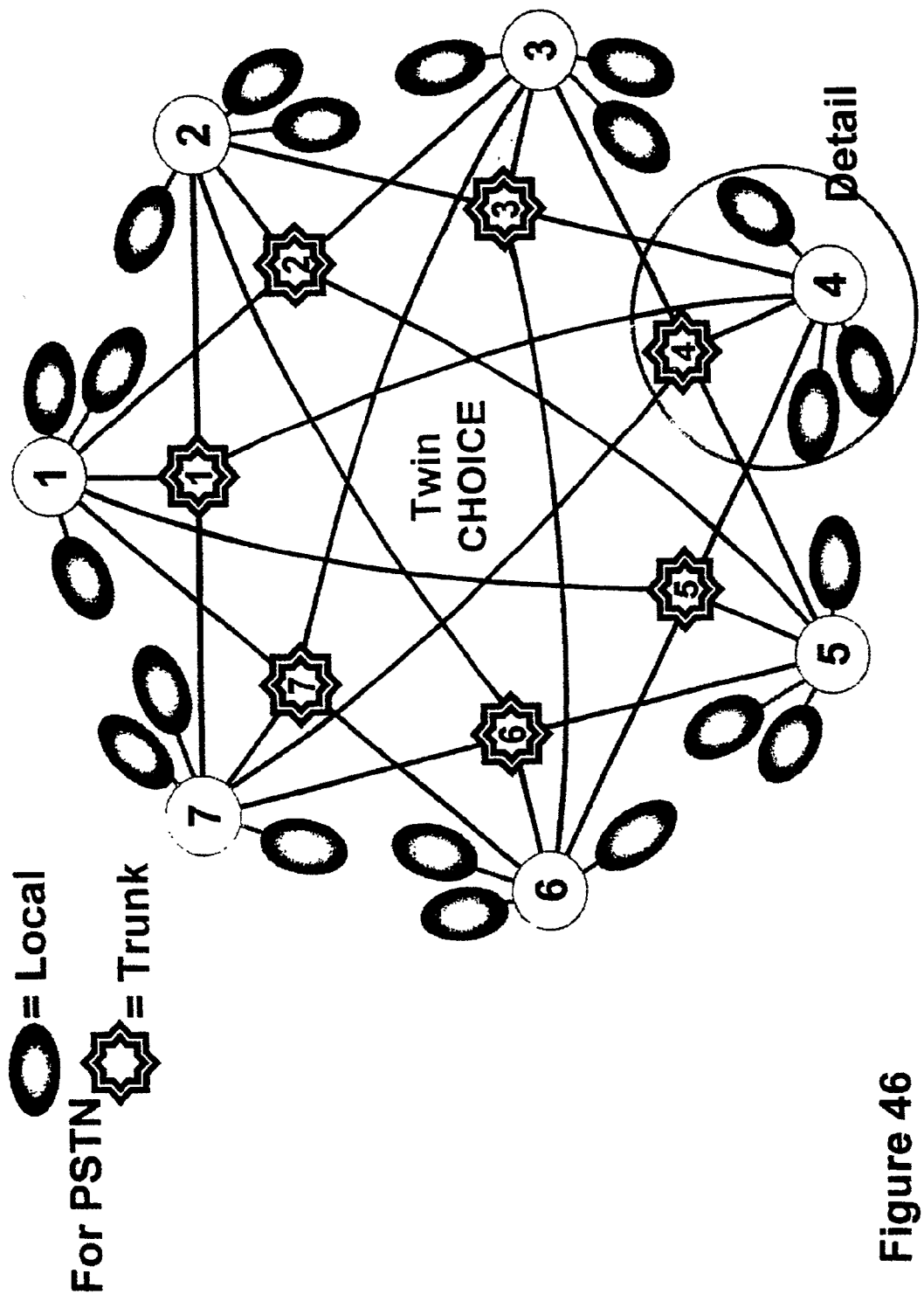
Figure 47:
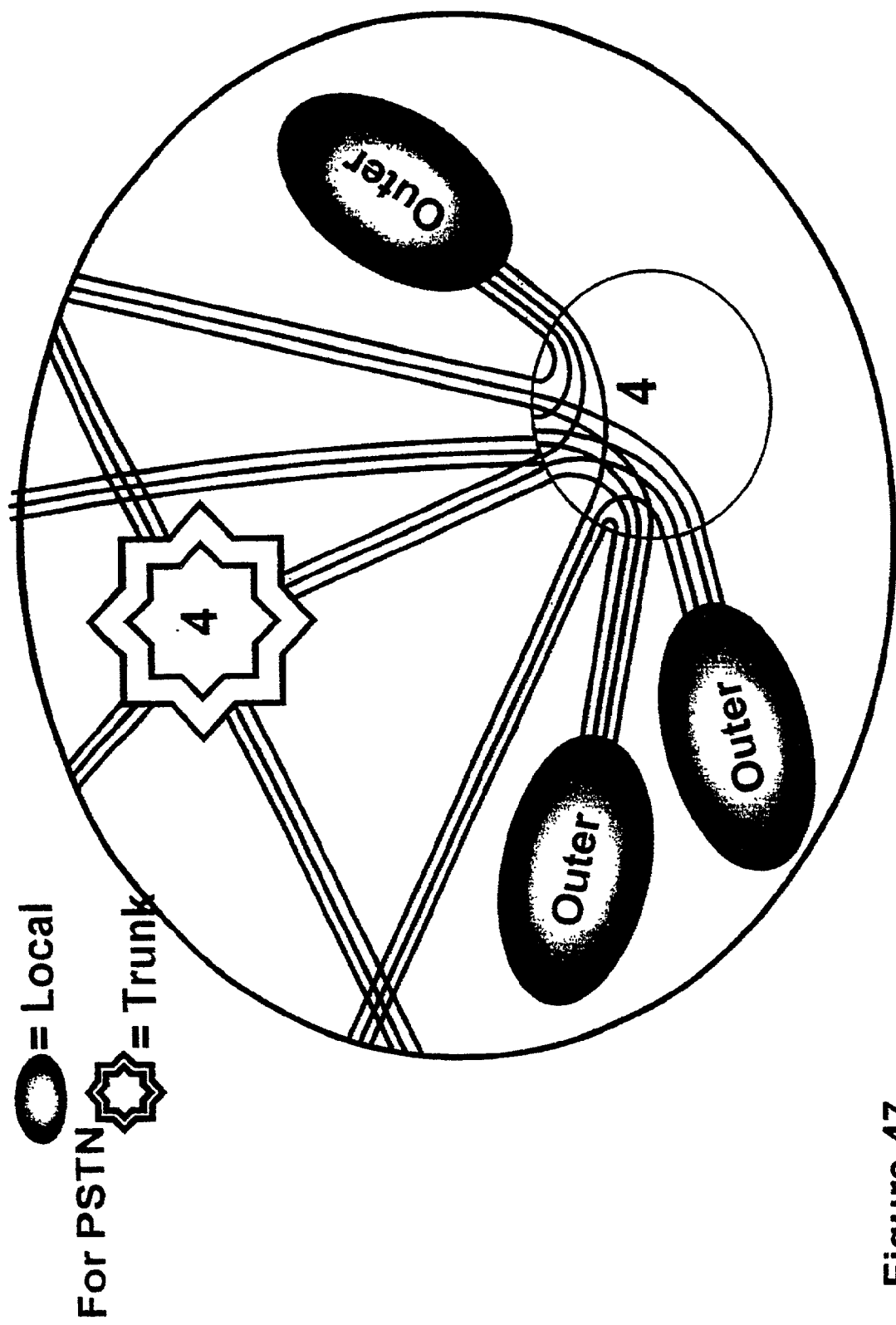
Figure 48:
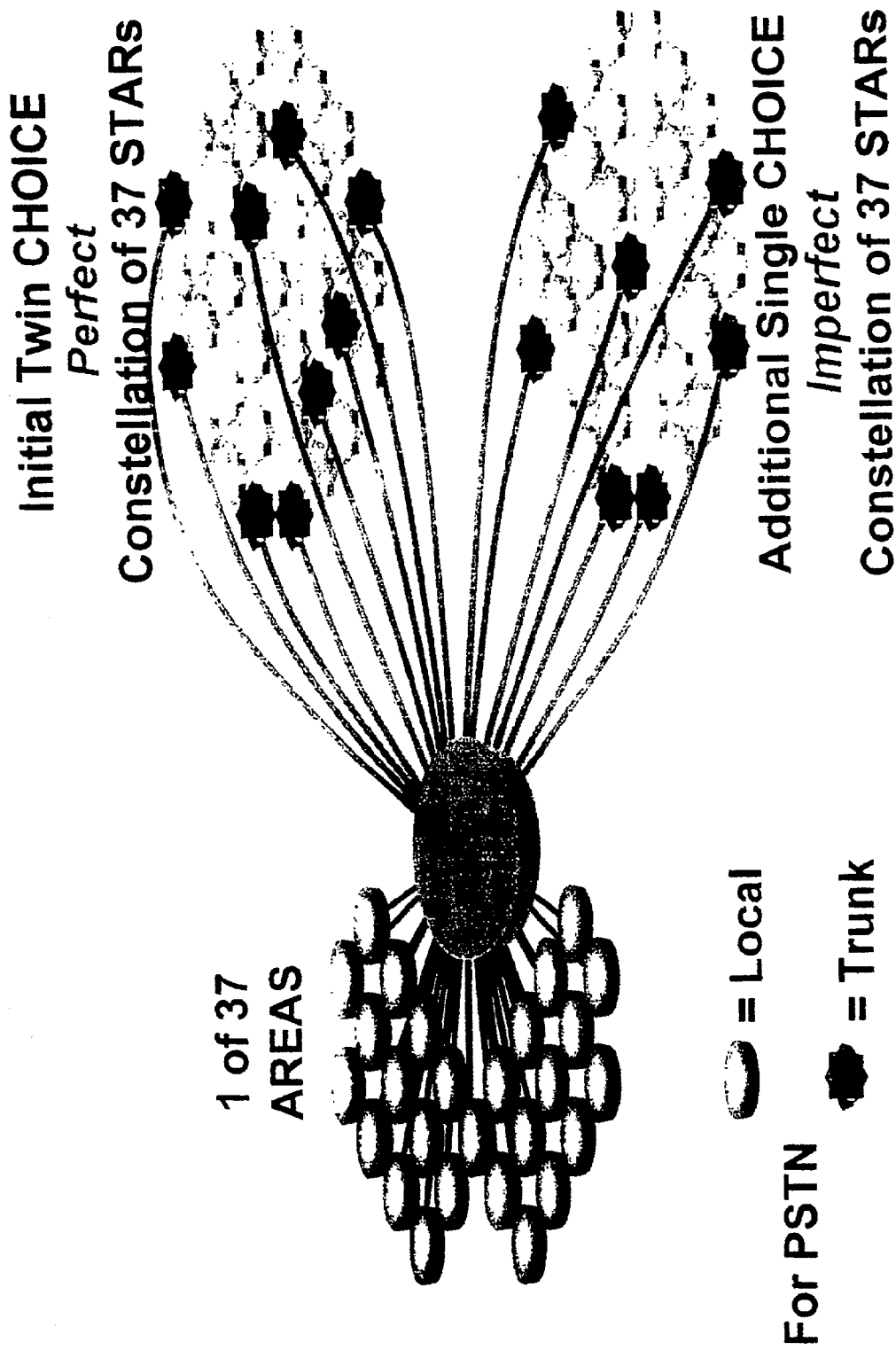
Figures 49, 49A:
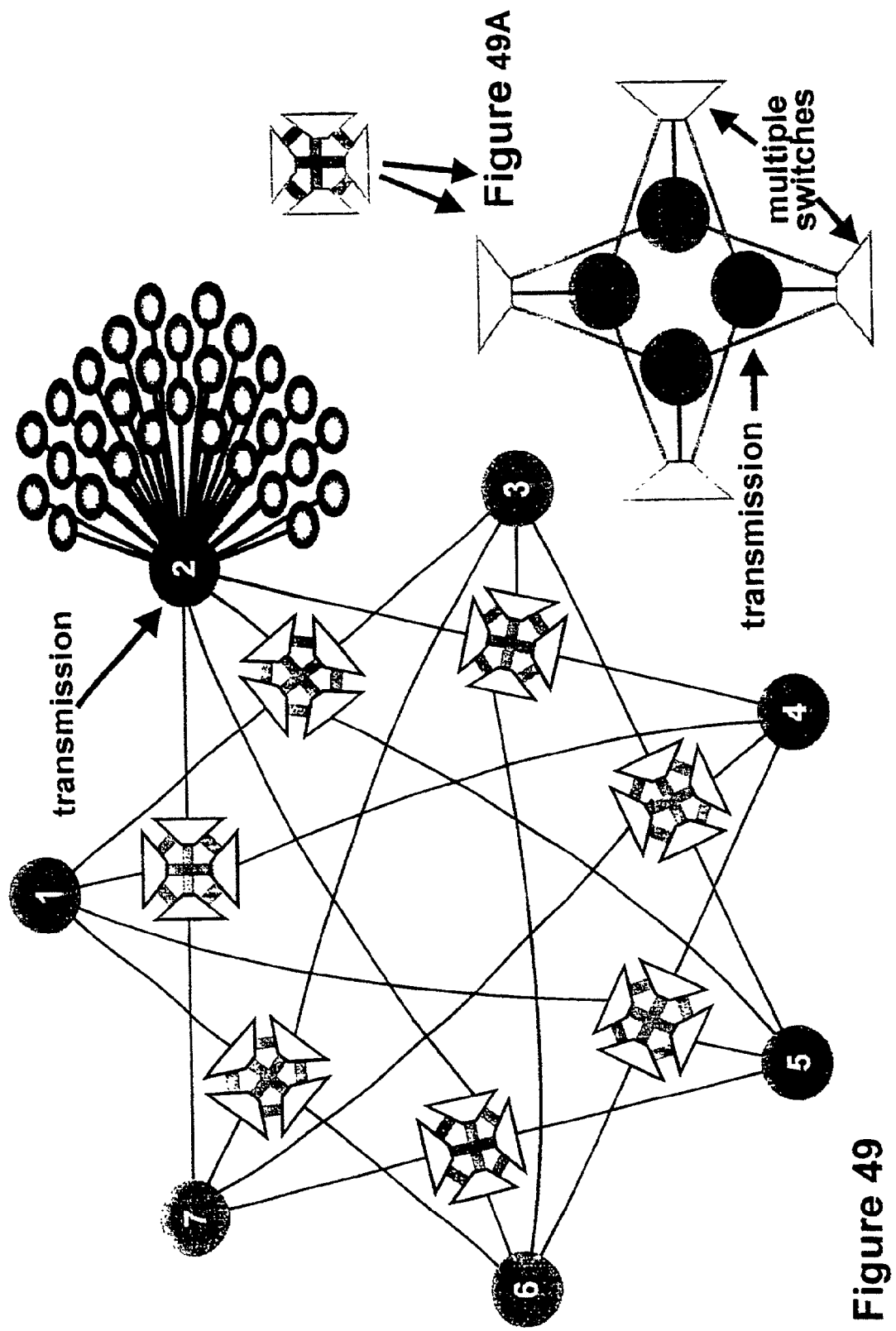

FIG. 31 shows a 15 AREA Single CHOICE network using 3-pointed STARs;

Figure 32:
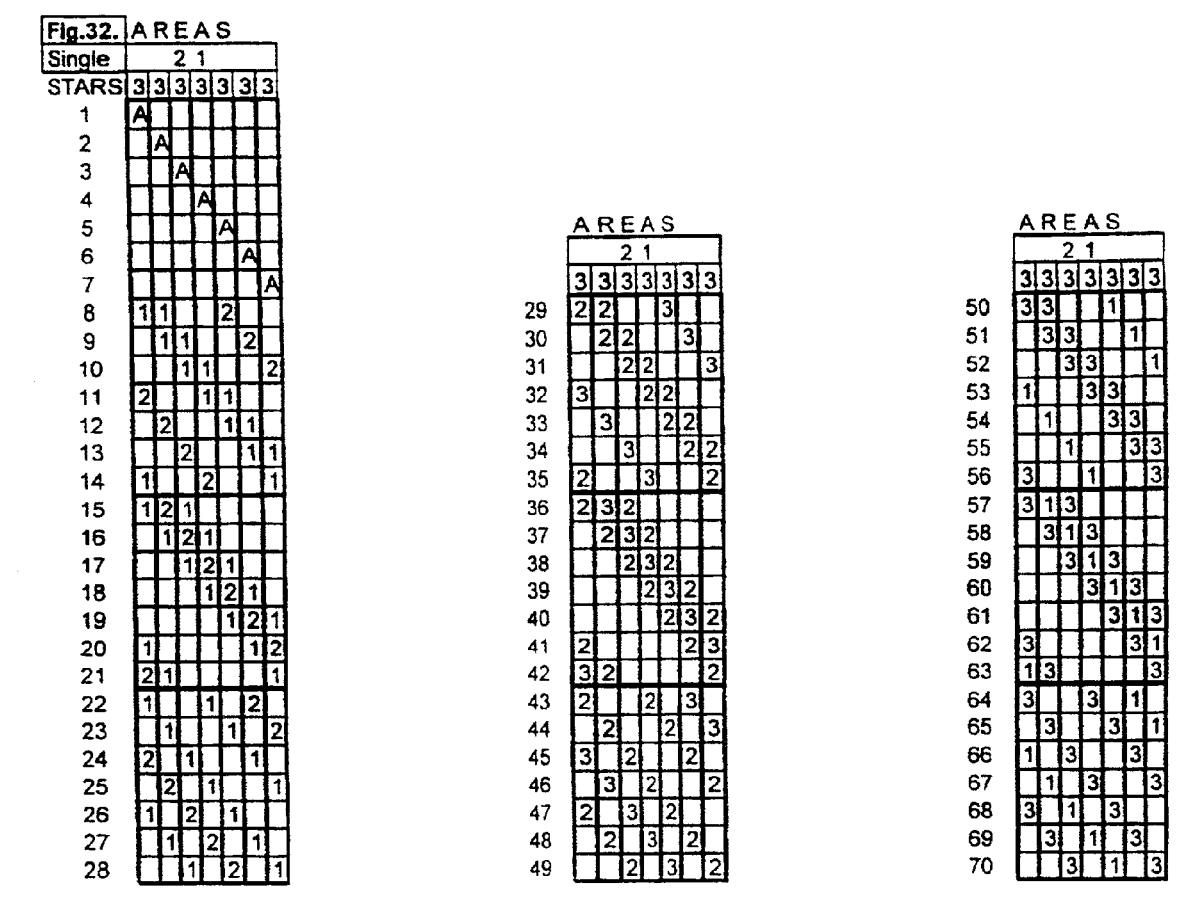

FIG. 32 shows a 21 AREA Single CHOICE network using 3-pointed STARs;

Figure 33:
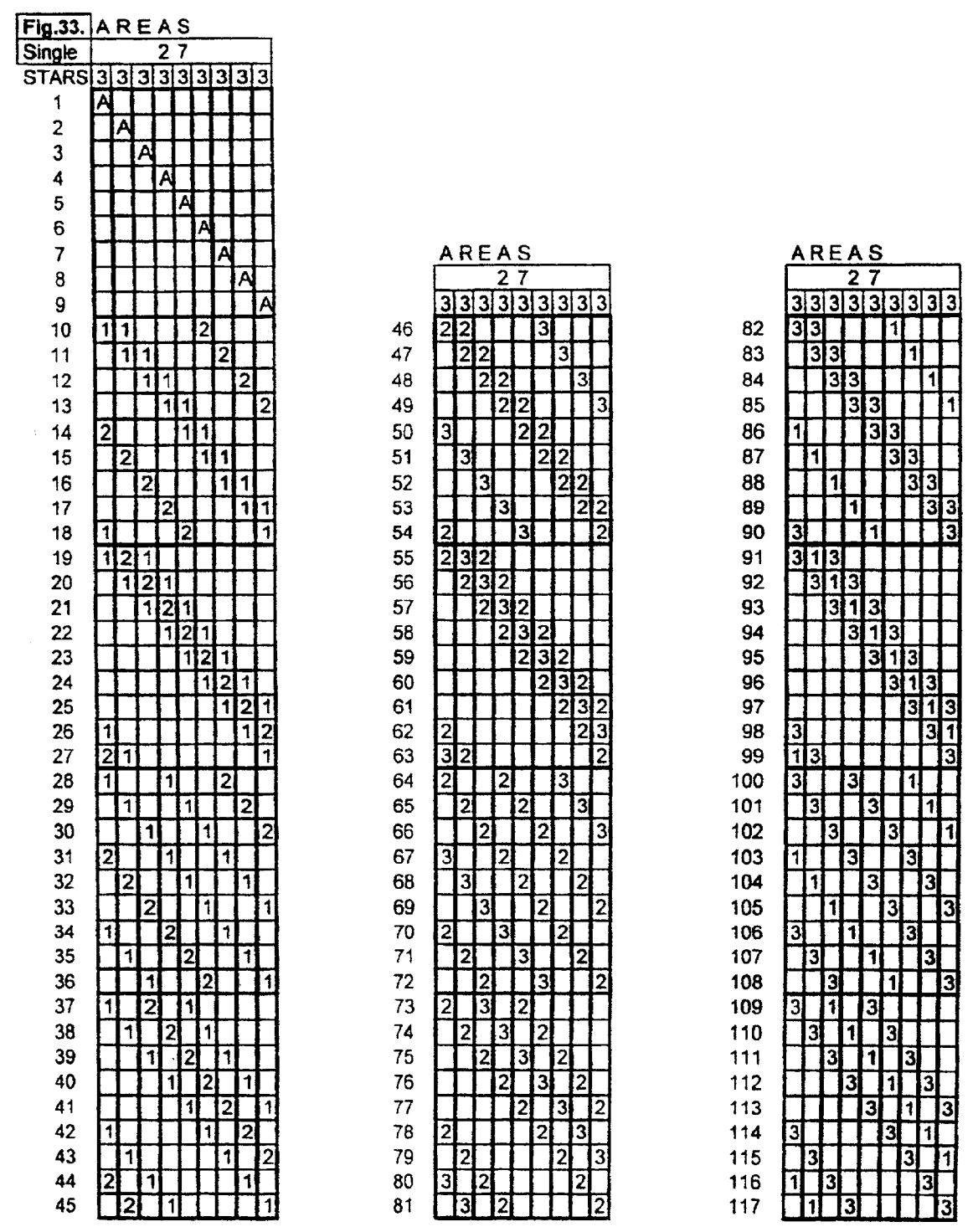

FIG. 33 shows a 27 AREA Single CHOICE network using 3-pointed STARs;

FIG. 34 shows a Partially Interconnected Network having 1 AREAs and 1 off 5-pointed STARs;

FIG. 35 shows a WAVESTAR for use in the mesh network of FIG. 34;

FIG. 36 shows the WAVESTAR connections to AREA 9 in FIG. 34;

FIGS. 37 and 38 show a form of the original single choice 7 AREAs and 7 STARs pattern and its twin CHOICE converse which can be used to construct larger patterns;

FIGS. 39, 40, 41 and 42 show examples of patterns formed using smaller original and converse patterns;

FIGS. 43 and 44 show a Digital Switching Subsystem (DSS);

Figure 45B:
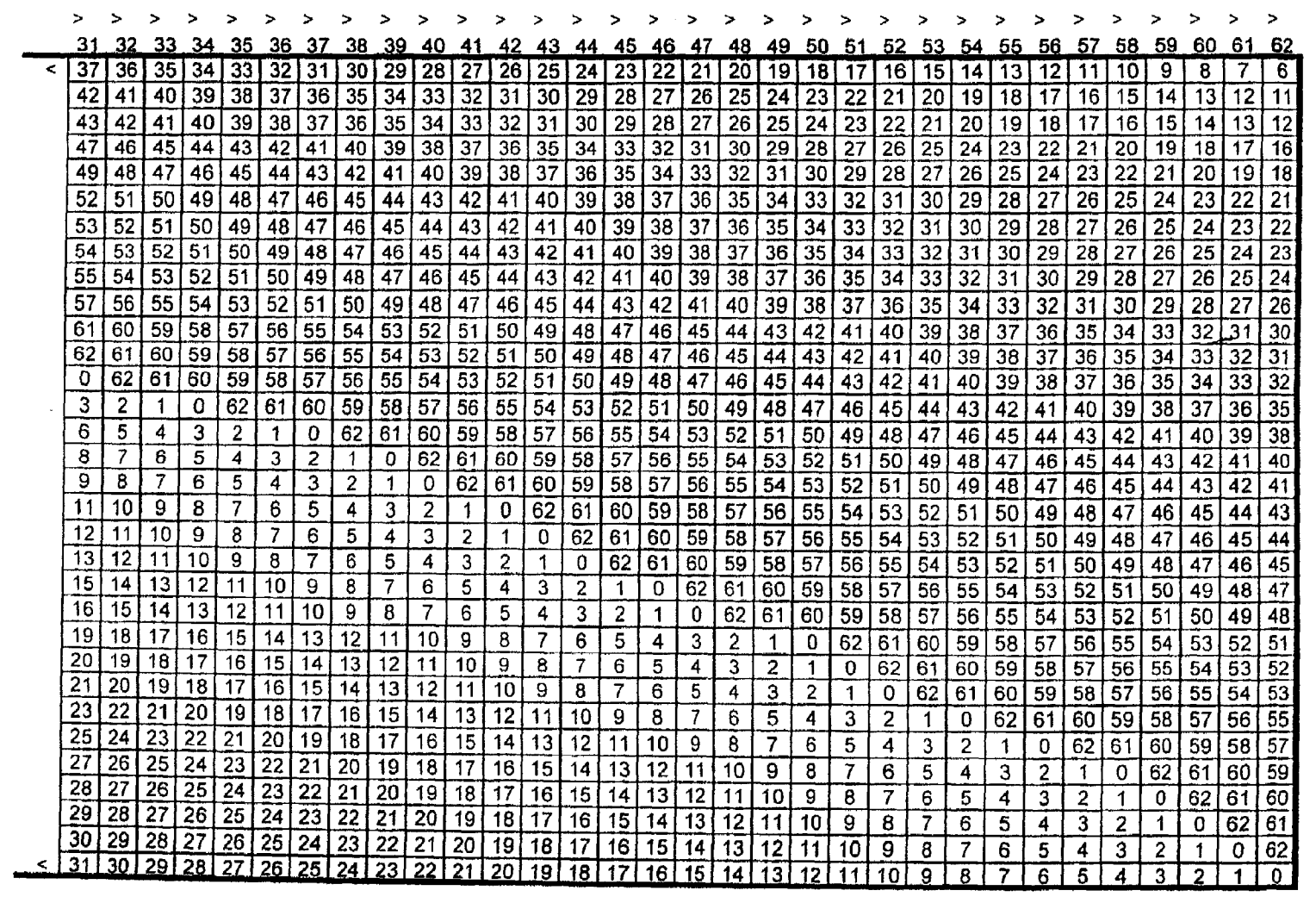

FIGS. 45A and 45B show a DMR transfer function;

FIG. 46 shows an interconnection pattern for 20 NODEs;

FIG. 47 shows the detail of AREA 4 of FIG. 46;

FIG. 48 shows a pattern using Perfect and Imperfect Constellations;

FIG. 49 shows a pattern illustrating the application of 7 Mesh STARs;

FIG. 49A shows the detail of a Mesh STAR from FIG. 49; and

Figure 50:
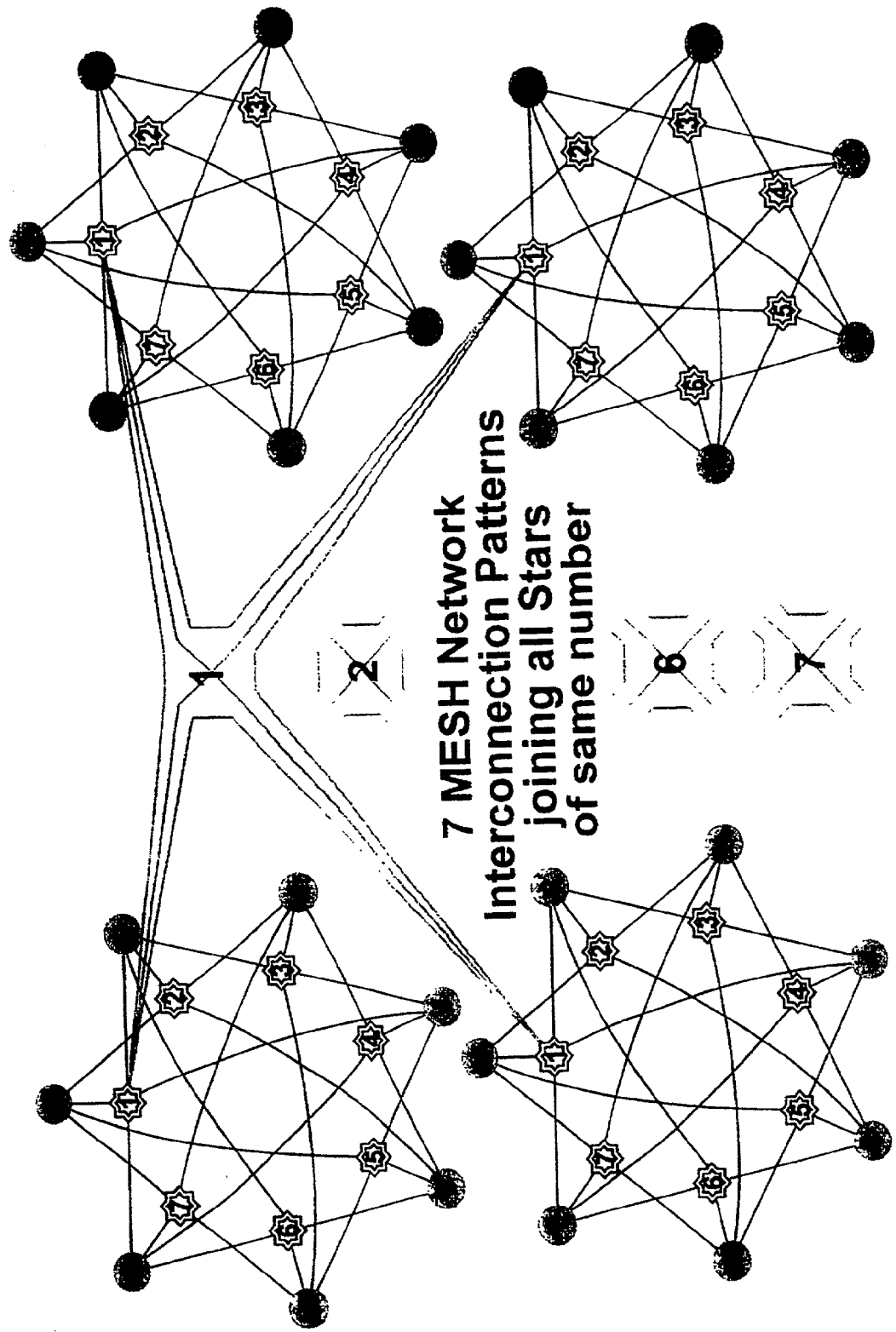

FIG. 50 shows an example where there are multiple Partially Interconnected Networks with Mesh Connections between corresponding STARs.

Figure 1:
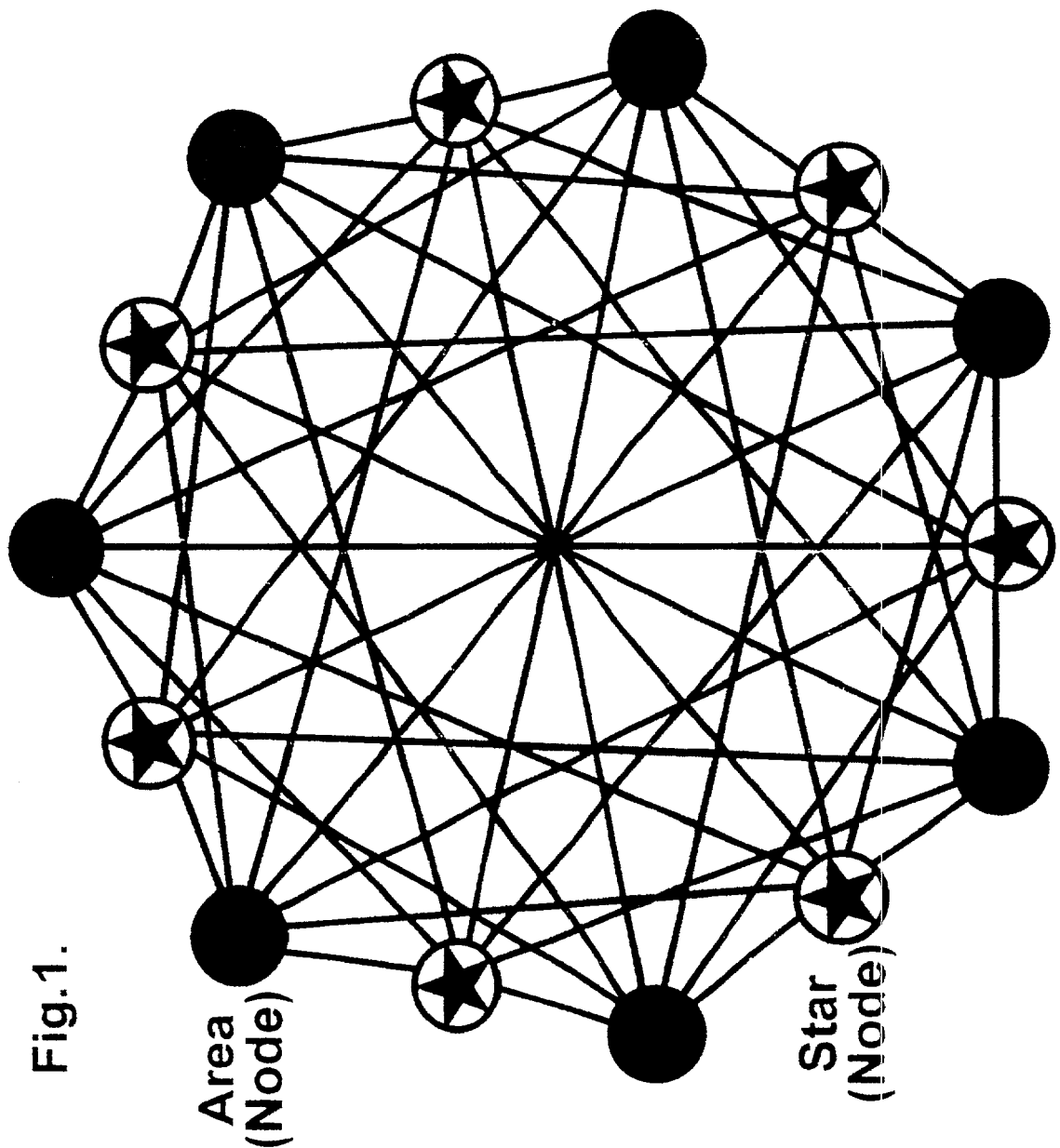
Figure 2:
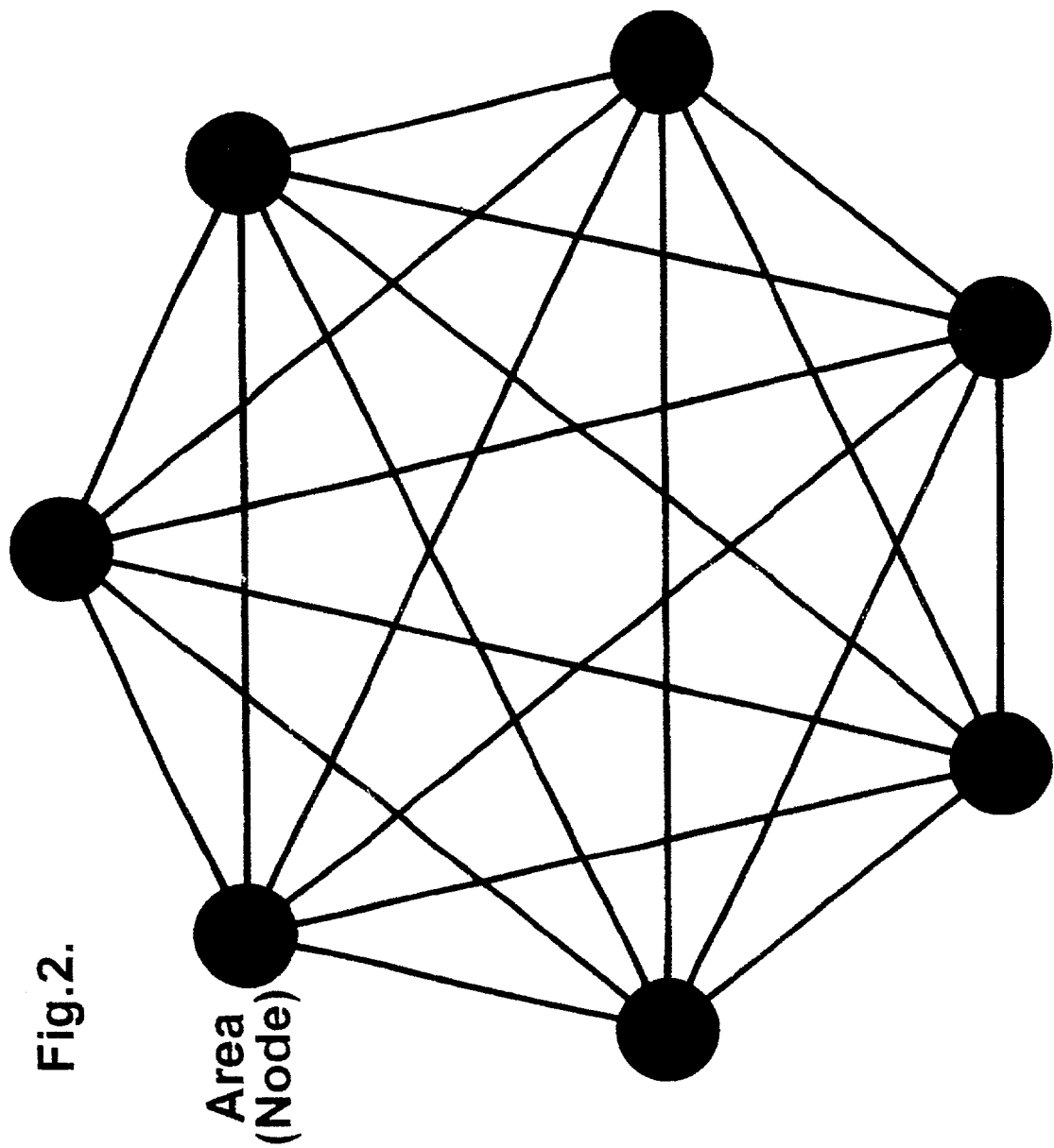
FIG. 2 shows a schematic diagram of a fully-meshed network.

FIG. 1 gives an example of a fully-connected 3 Stage Network where 7 AREAs (Nodes) are fully interconnected via 7 STARs Nodes giving 7 routes between each pair of AREAs (Nodes), whereas FIG. 2 shows a fully meshed network. The disadvantage of a fully meshed network is that as the number of AREA Nodes increases so the size of the routes between the AREA Nodes has to be reduced if the switches at the AREA Nodes are already at maximum capacity.

In order to utilise regular interconnect patterns in networks with a variable number of local nodes (e.g. local exchanges), it is necessary to group the local nodes into areas. AREAs are not intended, in general, to represent geographical areas, though they may do so.

A number of regular interconnection patterns will now be shown where the number of STAR nodes (e.g. trunk exchanges) equals the number of AREAs (or an integral multiple of the number of AREAS). Further interconnection patterns will be shown where the number of STAR nodes does not equal the number of AREAs (or an integral multiple of the number of AREAS).

It is stressed that the number of circuits (or capacity) handled by a route will depend on the physical capacity of the transmission. The key aspect of the present invention is which nodes have routes between them, the capacity of each route being a separate dimensioning issue and in practical networks the routes may not all have the same capacity/number of circuits.

A simple 3-stage network could have all the local nodes connected to all the STAR (Trunk) Nodes. For a Partially Interconnected Network: all the Local Nodes in an area are connected to a fixed number of STAR Nodes, but not to all the STAR Nodes.

Partially Interconnected Networks will have a fixed choice in the number of connection routes between a local node in one area and a local node in another area. This fixed number will be called CHOICE, as where there is more than one connection route a choice can be made between them. Where the CHOICE is one this is described as a Single Connectivity Pattern, where the CHOICE is two a Twin connectivity Pattern, etc.

For the purpose of understanding the patterns described it is easier to concentrate on the relationships between the AREAs and the STARs One object of the present invention is to determine regular Partial Interconnection Networks with Single, Twin, etc. connectivity patterns. For there to be a possibility of this to happen the following relationship needs to be valid:

(AREAs)×(AREAs−1)×(CHOICES)=(STARS)×(ROUTEs)×(ROUTES−1) where AREAs is the number of AREAs, CHOICEs is the fixed number of connection routes, STARS is the number of STAR Nodes, ROUTEs is the number of AREAS to which a STAR has connections.

This formula is only valid for integer values of AREAs, CHOICEs, STARs and ROUTEs. The object of the formula is to match the total number of single routes between the areas (AREAs)×(AREAs−1) with the number of routes provided by each STAR Node, (ROUTEs)×(ROUTEs−1) multiplied by the number of STARs. For multiple choice arrangements the STARs must provide 2, 3, etc. times the number of routes.

Just because there is a possibility of finding a fixed choice connectivity pattern does not mean that any such pattern exists. The following relationship also needs to be valid:

(STARs)×(ROUTEs)/(AREAs=a positive integer

This further relationship is of importance when the number of STARs is not equal to the Number of AREAs.

The benefits from using Partially Interconnected Networks (rather than not using) include:
building larger networks with the same size switch;
building the same network, with less switches;
building larger networks from switches with limited numbers of ports;
reducing the number of switches that are traversed;
having multiple CHOICE routing;
having fault tolerant characteristics with "1 in N" sparing;
having effective growth characteristics;
having simple self-balancing, traffic characteristics;
having larger route sizes as number of STARs increases;
being independent of switching technology.

Two important points to be remembered are, firstly that the network routing pattern can be expressed as a simple table (especially ones based on rotational patterns) and secondly that once the routing pattern is defined, the actual capacity of the individual connections and paths do not have to be the same size. In the PSTN for example a connection is normally made up from multiple primary rate multiplexes and this can still continue.

The segregation of Outer Nodes into AREAs should not necessarily be done so that there are the same number of Outer Nodes per AREA, but that the total traffic generated by an AREA should preferably not be widely dissimilar from the other AREAs.

Most traffic between Outer Nodes associated with the same AREA can be routed via a nearby STAR, although any of the STARs connected to that AREA can be used as alternatives.

There is a possible disadvantage with being connected to a STAR on the same site as the AREA Crossconnect. The two alternate routings between two adjacent AREAs may be carried by the same transmission system. There are patterns which ensure the alternative routings do not go along the same notional link, but these tend to require that an AREA N is not connected to a STAR N.

In the arrangements shown below the AREAs and STAR Nodes are cyclically numbered for ease of explanation, but this identification is not an essential feature of the invention and other identifiers may be used or none at all.

Figure 3:
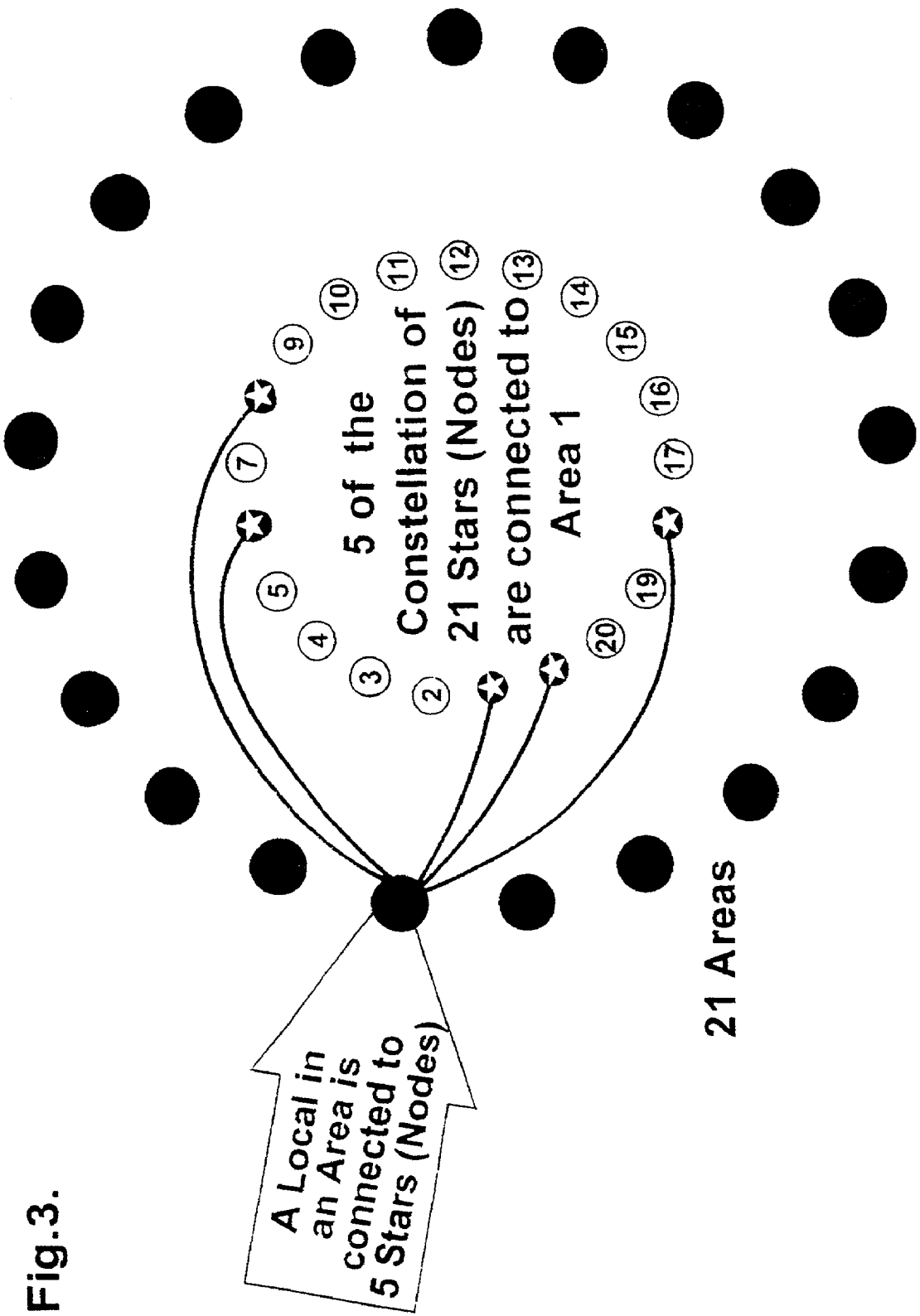
FIG. 3 shows a schematic diagram where one AREA is connected to 5 STARs.
Figure 4:
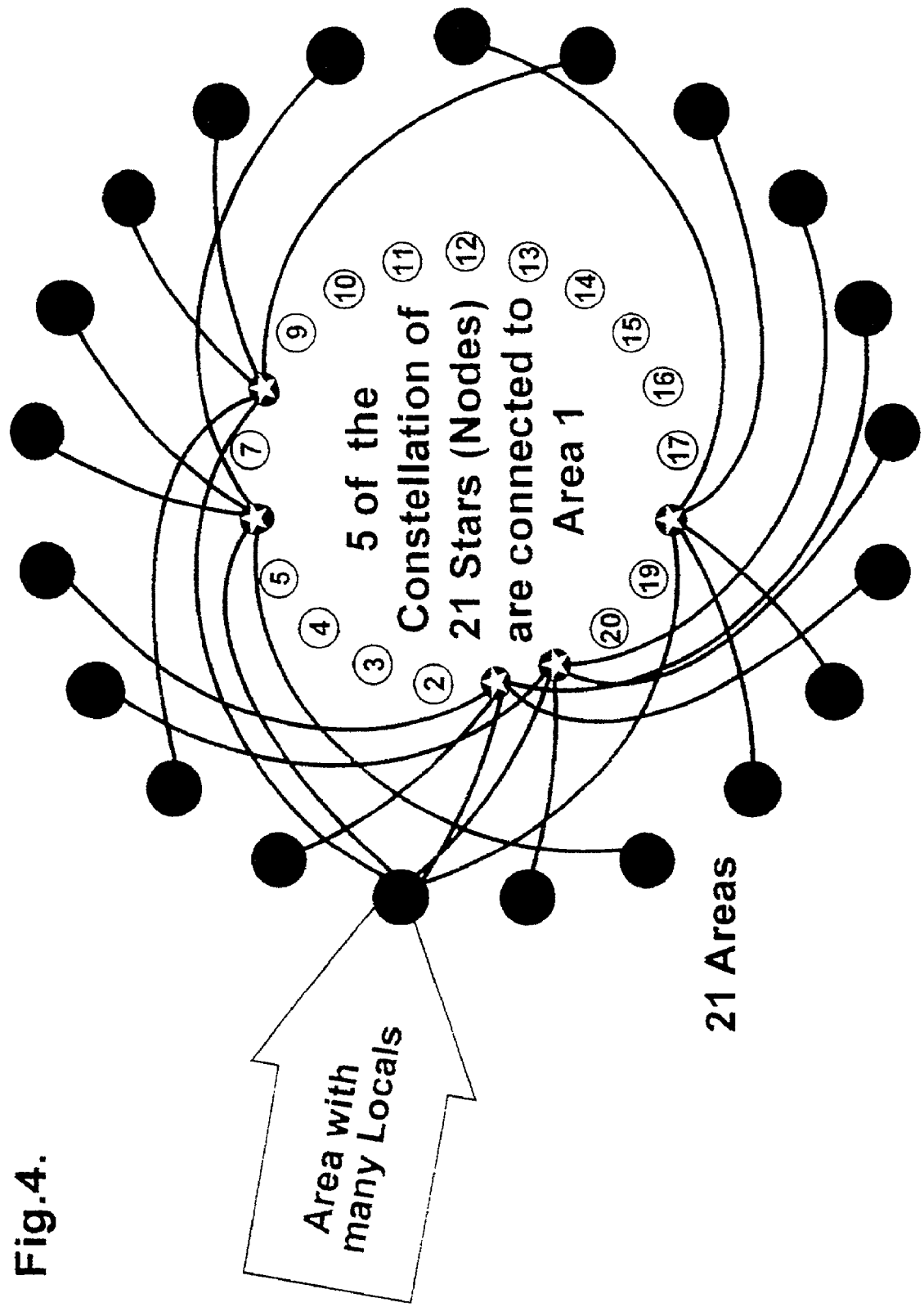
FIG. 4 shows a schematic diagram where STARs are each connected to 5 AREAs.

Consider 21 AREAs and 21 STARs as shown in FIGS. 3, 4 and 5:

| AREA 1 is connected to STARs | 1. | 6. | 8. | 18. | 21. |
| AREA 2 is connected to STARs | 2. | 7. | 9. | 19. | 1. |
| AREA 3 is connected to STARs | 3. | 8. | 10. | 20. | 2 etc. |

To traverse from AREA 1 to AREA 2 there is only one route and that is via STAR 1

To traverse to other areas

| | | |
|---|---|---|
| 1 to 3 via STAR 8 | 1 to 4 via STAR 21 | 1 to 5 via STAR 1 |
| 1 to 6 via STAR 6 | 1 to 7 via STAR 6 | 1 to 8 via STAR 8 |
| 1 to 9 via STAR 8 | 1 to 10 via STAR 6 | 1 to 11 via STAR 18 |
| 1 to 12 via STAR 8 | 1 to 13 via STAR 18 | 1 to 14 via STAR 21 |
| 1 to 15 via STAR 1 | 1 to 16 via STAR 21 | 1 to 17 via STAR 1 |
| 1 to 15 via STAR 1 | 1 to 16 via STAR 21 | 1 to 17 via STAR 1 |
| 1 to 18 via STAR 18 | 1 to 19 via STAR 18 | 1 to 20 via STAR 6 |
| 1 to 21 via STAR 21 | | |

For the pattern shown in FIG. 4 to have the single connectivity property listed above, the connections to a STAR from an AREA must have the property of a set forming a contiguous sequence. This is where all the modulo differences of the numbers allocated to the cyclically numbered STAR Nodes (connected to an AREA) selected in pairs form a contiguous sequence from one to the number of cyclically numbered AREAS less one.

Figure 6:
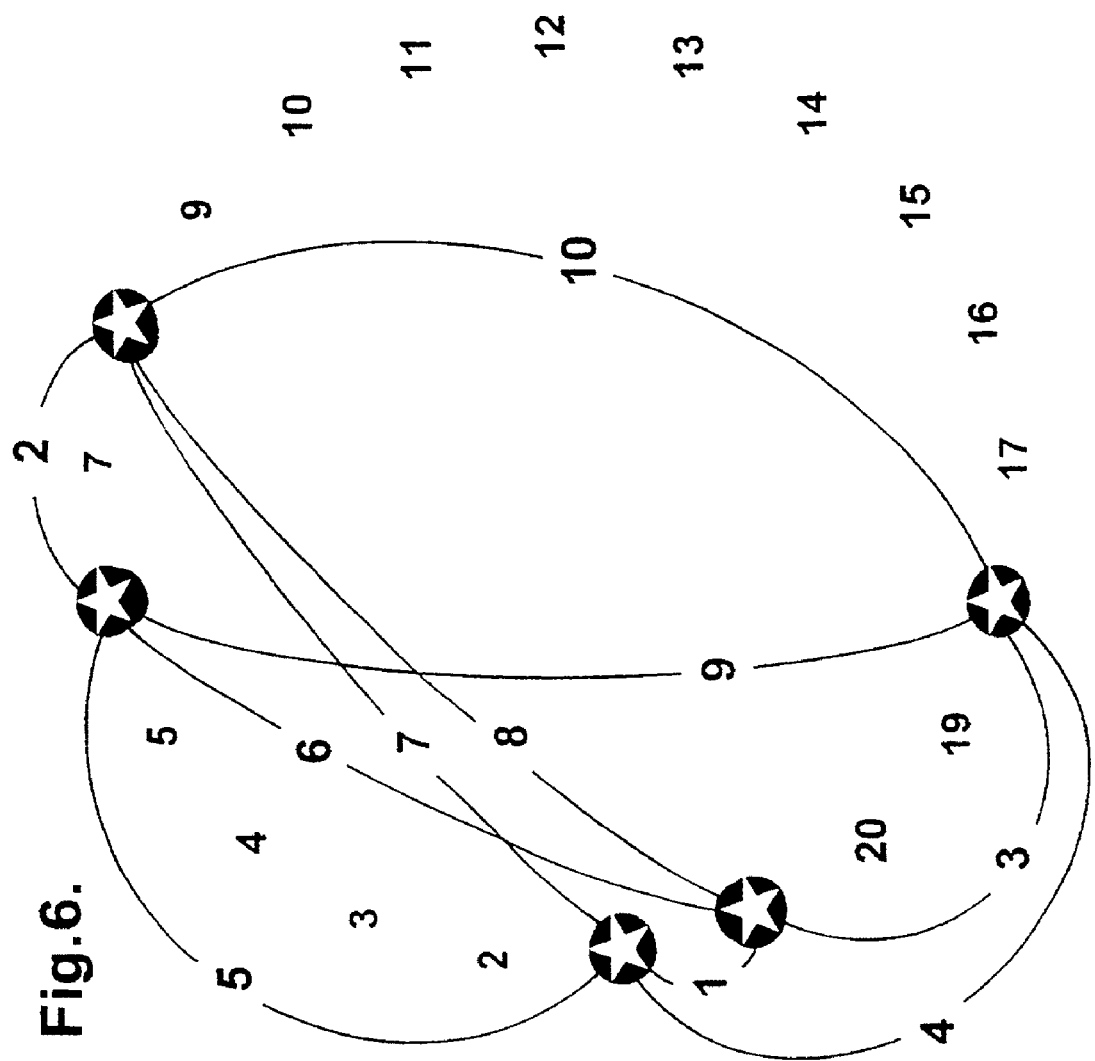
FIG. 6 shows the contiguous sequences from FIG. 4.

For this example which uses 21 AREAS with connections to 5 STARs (namely 1, 6, 8, 18 and 21) out of a Constellation of 21 STARs (FIG. 6) there are 10 pairings of STARs and the modulo differences are as follows:

| STAR Pairings | Modulo Differences SPANNING DIFFERENCES | |
| --- | --- | --- |
| 1 | 21 | 1 & 20 |
| 6 | 8 | 2 & 19 |
| 18 | 21 | 3 & 18 |
| 1 | 18 | 4 & 17 |
| 1 | 6 | 5 & 16 |
| 6 | 21 | 6 & 15 |
| 1 | 8 | 7 & 14 |
| 8 | 21 | 8 & 13 |
| 6 | 18 | 9 & 12 |
| 8 | 18 | 10 & 11 |

For each such fixed choice rotational connectivity pattern there is a similar, but counter-rotational version of the pattern of FIG. 5, which is shown in FIG. 7.

An arrangement of STARs (e.g. 21 STARS) is called a Constellation. For a network that requires twice the throughput then a second constellation could be connected in parallel to the first constellation. In such a case by using a fixed choice counter rotational connectivity pattern, then a significant advantage results. This not only adds redundancy but also if a STAR should fail then the traffic formerly carried by the failed STAR could be shared between 4 STARs in the other 21 STAR Constellation.

The use of regular rotational patterns which provide contiguous sequences is a convenient way to analyse and deduce Partially Interconnected Networks which have a fixed choice connectivity for example single connectivity, twin connectivity, etc. However, once the connectivity pattern has been established the pattern can be transformed by reordering the AREAs and by reordering the STAR Nodes, whilst still retaining an equal number of connection routes between any two Local nodes in different areas. A connection route comprises two point-to-point interconnection means connected in series by a STAR Node, see FIG. 8. The AREAs and STAR Nodes can also be renumbered. The original AREA and STAR numbering used on FIG. 5 is shown on the bottom and right respectively on FIG. 8.

Figure 9:
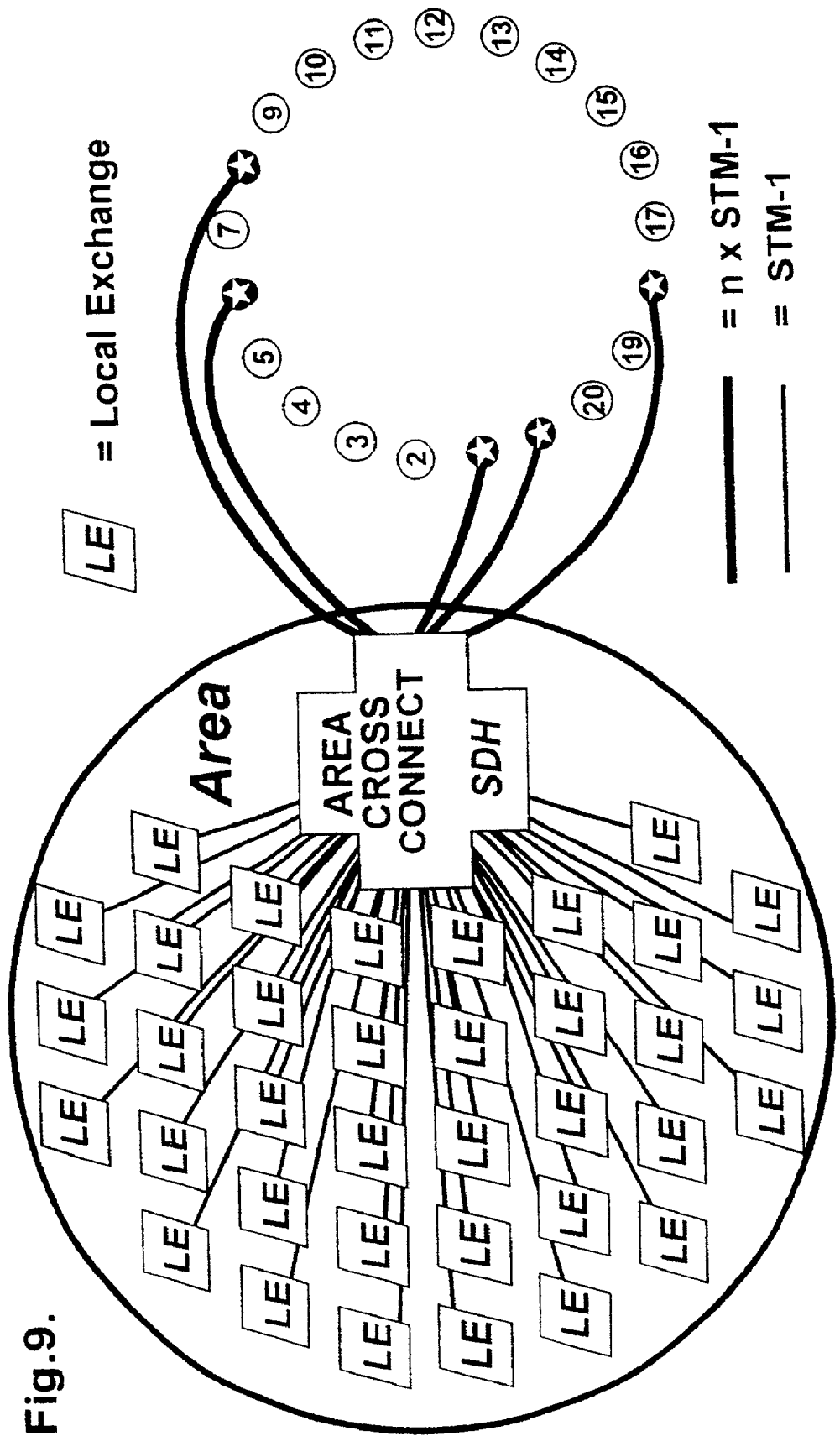
FIG. 9 shows a schematic diagram using a single SDH-AREA Crossconnect.
Figure 10:
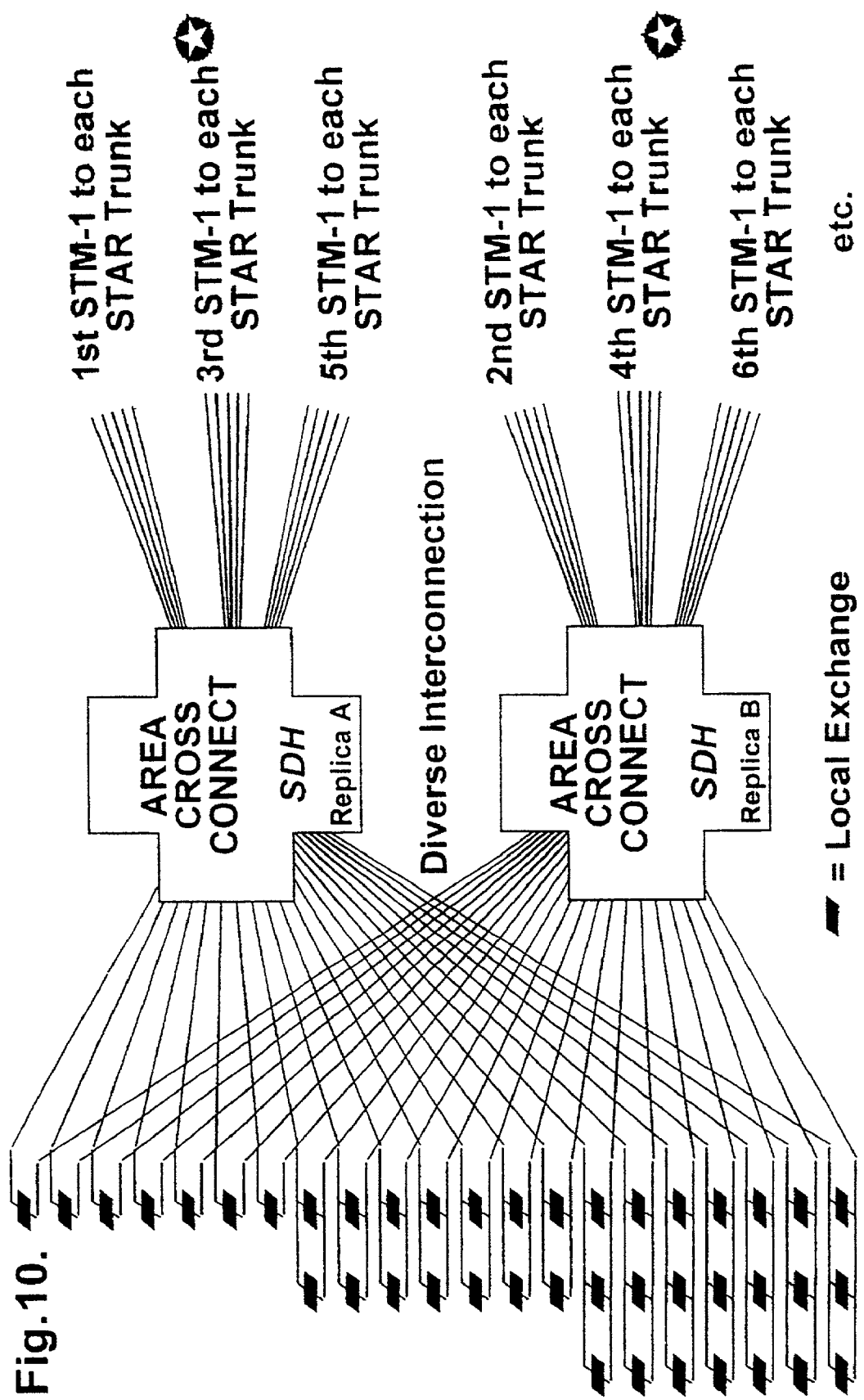
FIG. 10 shows a schematic diagram using a pair of SDH-AREA Crossconnect.

The use of Partially Interconnected Networks is appropriate to telecommunications networks which have local exchanges and trunk exchanges. The local exchanges are grouped into areas and connected to a set of STAR Trunks. In order to simplify transmission connections the use of an AREA Crosscomect can be considered. A Synchronous Digital Hierarchy (SDH) Crossconnect, or a pair of SDH Crossconnects for redundancy. FIGS. 9 and 10 respectively, can be employed. Two Synchronous Transport Module (STM)-1s are connected to a local, a pair of locals or 3 locals one being taken to each of the two Crossconnects making an AREA Crossconnect. A first set of STM-1s is taken to the STAR Trunks (normally one per star) from a Replica A. A second set of STM-1s is taken to the STAR Trunks (normally one per STAR) from Replica B.

The use of Partially Interconnected Networks is also appropriate to packet, router, transmission and indeed any large network where the sizes of switches are limited, or where redundant architectures are required.

In data networks running with the Internet Protocol (IP) the AREA Crossconnect could be an IP router, or a pair of IP routers for redundancy, or an ATM switch, or a pair of ATM switches for redundancy.

FIG. 11 lists some examples of the rotational patterns where the number of STARs equals the number of AREAs or a multiple of the number of AREAs. The pattern examples detail the AREAs connected to STAR 1 for rotational and multi-rotational patterns. FIG. 12 lists some examples of non-rotational patterns.

FIG. 11 and FIG. 12 also list patterns that can be formed by taking a known CONSTELLATION using 7-pointed STARs and replacing all (or some) of the 7-pointed STARs with 7 three-pointed STARS. They also lists patterns that can be formed by taking a known constellation using 4-pointed STARs and replacing all (or some) of the 4-pointed STARs with 4 three-pointed STARs, the final pattern having twice the number of CHOICES. Similarly 7-pointed STARs can be replaced by 7 four-pointed STARS. Such transforms considerably increase the traffic carrying capacity of a network.

Another way of increasing capacity is by adding another complete constellation, however if only one or some STARs are overloaded then by just placing a further STAR in parallel with an existing STAR this will also increase the capacity of the overloaded part of the network. Although the network may have extra choices on some routes, this is still a very practical network. It is possible to limit the choices in the routing tables to restrict the choices whilst still retaining the increased load capacity.

Examples of Twin (FIG. 13), Triple (FIG. 14), Quad (FIG. 15) and Quin (FIG. 16) choice rotational connectivity patterns are shows on the indicated figures. The use of computer programs to look for valid contiguous spanning sequences can simplify, the examination process.

Digital Switching Subsystem (DSS) mark 2 terminates STM-1 or part STM-1 as shown in FIG. 17. DSS mark 2 is a subsystem of System X, which is a telecommunication system marketed by Marconi Communications Limited. G.703 is a telecommunication interface recommendation by the International Telecommunications Union Telecommunications (ITU-T). The line shelf used can also terminate STM-4s. A STAR Trunk receives 6×STM-1s from the 5 AREAS. DSS mark 2 can accept 30 or 31 STM-1 s. The description is based on dedicated STM-1 transmission but Plesiochronous Digital Hierarchy (PDH) and STM-4s can be used where appropriate and all transport could also be patched through the general 2 Mbit/s network.

It is possible to have Partially Interconnected Networks where the number of STARs is not an integer multiple of the number of AREAS. FIG. 18 shows an example of this where two different rotational arrangements are used to create a 3 CHOICE pattern. Other examples are listed in FIG. 11 for using 2, 3, 4 and 5 rotational arrangements to create both single and twin choice patterns.

It is also possible to have Partially Interconnected Networks where the number of STARs is not an integer multiple of the number of STARS, although (STARs)×(ROUTEs)/(AREAs) must be an integer. FIG. 19 shows an Asymmetric twin choice network for 12 AREAs with 44 STARs which has 4 different patterns of 11 stars which rotate around 11 of the 12 AREAs and in which a large number of 3-pointed STARs are used.

FIG. 20 has 16 AREAs and 16 STARs, but it is not formed from a single rotational pattern, but from 4 patterns. It is a twin CHOICE network giving redundancy with each numbered STAR being connected to the same numbered AREA. Because of its symmetry it only requires a total of 40 transmission links between the 16 AREA Nodes/(Crossconnects/Routers and the 16 STAR Nodes. However some care would be required as both paths of some redundant pairs of paths are carried by the same transmission link.

FIG. 21 is a redrawn form of FIG. 20, but without each numbered STAR being connected to the same numbered AREA, 48 transmission links are required between the 16

AREA Nodes/Crossconnects/Routers and the 16 STAR Nodes, but this time no redundant pairs of paths are carried by the same transmission link.

FIGS. 22 and 23 are two ways, using different groupings, that single connectivity networks can be formed for 16 AREAs and 20 STARs. These are examples of where the number of AREAs is neither equal to the number of STARs nor an integer multiple of the number of STARS. The figures are drawn with each numbered AREA being connected to the same numbered STAR.

FIG. 24 uses 4-pointed STARs, but with '3 groups of 3 and 1 group of 1 to give a twin choice network for 10 AREAs using 15 STARs.

FIG. 25 shows an Asymmetric Triple CHOICE network where the AREAs have been divided into two groups of 4 and 4-pointed STARs are used.

FIG. 26 shows an Asymmetric Twin CHOICE network which has been drawn with each numbered STAR being connected to the same numbered AREA. Some of the following patterns are not drawn this way where it is easier to show how a range of patterns can be constructed from a basic concept.

FIGS. 27 and 28 both have 9 AREAs and 12 STARs, but the two figures have been drawn in slightly different ways.

FIG. 28 is the first of an infinite series of patterns: where the STARs have an odd number of ROUTEs {ROUTEs equals an odd integer}: where the number of AREAs is the square of the number of ROUTEs on the STAR i.e. {AREAs=(ROUTEs)×(ROUTEs−1)}: and where the number of STARs=(ROUTEs)×(ROUTES+1). In this case ROUTEs=3, AREAs=9, STARs=12.

FIG. 29 shows the second in the series where ROUTEs=5, AREAs=25, STARs=30. FIG. 30 shows the third in the series where ROUTEs=7, AREAs=49, STARs=56. Some more in this series are listed in FIG. 12.

FIG. 27 is the first of an infinite series of patterns using 3-pointed STARs where there are an odd number of groups and each group contains 3 AREAs.

FIG. 31 is the second of the series with 35 off 3-pointed STARs connecting 15 AREAs. It shows the same pattern in three ways in order to help explain the notation used in later figures. The extra numbers to the right of the first pattern show the numbering of the STARs that would be necessary so that AREAs can be connected to a STAR with their own number.

FIG. 32 is the third of the series with 70 off 3-pointed STARs connecting 21 AREAs. The first seven STARs are used to connect the AREAs together within a group with the remaining STARs used to connect 3 STARs from 7 of the groups.

FIG. 33 is the fourth of the series with 117 off 3-pointed STARs connecting 21 AREAs. The first seven STARs are used to connect the AREAs together within a group with the remaining STARs used to connect 3 STARs from 9 of the groups. FIG. 33 has been drawn showing how 9 STARs use the same pattern that has been shifted round by one. There are 12 such shifted patterns. The same form of pattern is used in each of the columns. In the first column the spacing of the '1's is increased by one between each arrangement of 9 STARs whilst the '2' is always equidistant from each of the '1's.

A Partially Interconnected Network may be created where the STARs are WAVESTARs, that is the links are optical links.

Considering a network as shown in FIG. 34 where a full mesh is required between all the 11 AREAs A=11. Consequently A(A−1) direct simplex links, in this case 110, would be required. Yet this would result in only a single CHOICE network and there would be no redundancy. The full mesh required is achieved, in FIG. 34, by using 11 WAVESTARs each with 5 ROUTEs. Each AREA is connected to 5 WAVESTARs and each WAVESTAR is connected to 5 AREAs.

A detailed arrangement of each of the WAVESTARs is shown in FIG. 35. Such a WAVESTAR uses Wavelength Division Multiplexes of four wavelengths.

Further detail is shown in FIG. 36, where AREA 9 is shown having duplex WDM connections to WAVESTARs 3, 6, 8, 9 and 10.

If WAVESTARs are considered only as a special form of repeater then there are only 55 simplex connections for this redundant twin CHOICE Partially Interconnected Network, compared with the 110 simplex connections for the unsecured single CHOICE mesh network.

Each WAVESTAR can be a passive optical device, probably with an optical amplifier on each input and output. The loss of an amplifier would not lead to the whole WAVESTAR being removed from service.

Using WAVESTARs enables diverse redundant mesh network topologies to be constructed from a reduced number of high bandwidth WDM links For networks it may often be adequate to have just 2 or 3 CHOICEs of routing. However, for a large three-stage switch which is made up from switching elements and which has multiple first stage switching elements multiple second stage switching elements and multiple third stage switching elements, then if a Partially Interconnected Network is used to join the said first stages to the said second stages and is also used to connect the said second stages to the said third stages, then networks having a large number of CHOICES seem to be much more appropriate. Some very useful arrangements are achieved when:

CHOICEs = a binary power of 2
(CHOICEs) × 2 = ROUTEs
(ROUTEs) × 2 = AREAs + 1
(ROUTEs) × 2 = STARs + 1 and AREAs×(AREAs−1)×CHOICEs=STARs×ROUTEs×(ROUTEs−1)

7 × 4 × 2 = 7 × 4 × 3
15 × 14 × 4 = 15 × 8 × 7
31 × 30 × 8 = 31 × 16 × 15
63 × 62 × 16 = 63 × 32 × 31
127 × 126 × 32 = 127 × 64 × 63
255 × 254 × 64 = 255 × 128 × 127
511 × 510 × 128 = 511 × 256 × 255

FIGS. 37 and 38 show an original single CHOICE pattern of 7 AREAs and 7 STARs (FIG. 37) and its converse twin CHOICE pattern of 7 AREAs and 7 STARs (FIG. 38). The converse pattern is formed by replacing each entry of a '1' with a null entry and replacing each null entry with a '1'. By taking one copy of one of these patterns and three copies of the other a larger pattern can be formed providing, that an appropriate extra column and row are added each time a larger pattern is formed in such a way.

In FIGS. 39 and 40 are shown 15 AREAs/15 STARs, 3 CHOICE and 4 CHOICE patterns respectively, formed from 3 Original 7×7 patterns and 1 Converse 7×7 pattern and 1 Original 7×7 pattern and 3 Converse 7×7 patterns, respectively.

Figure 41:
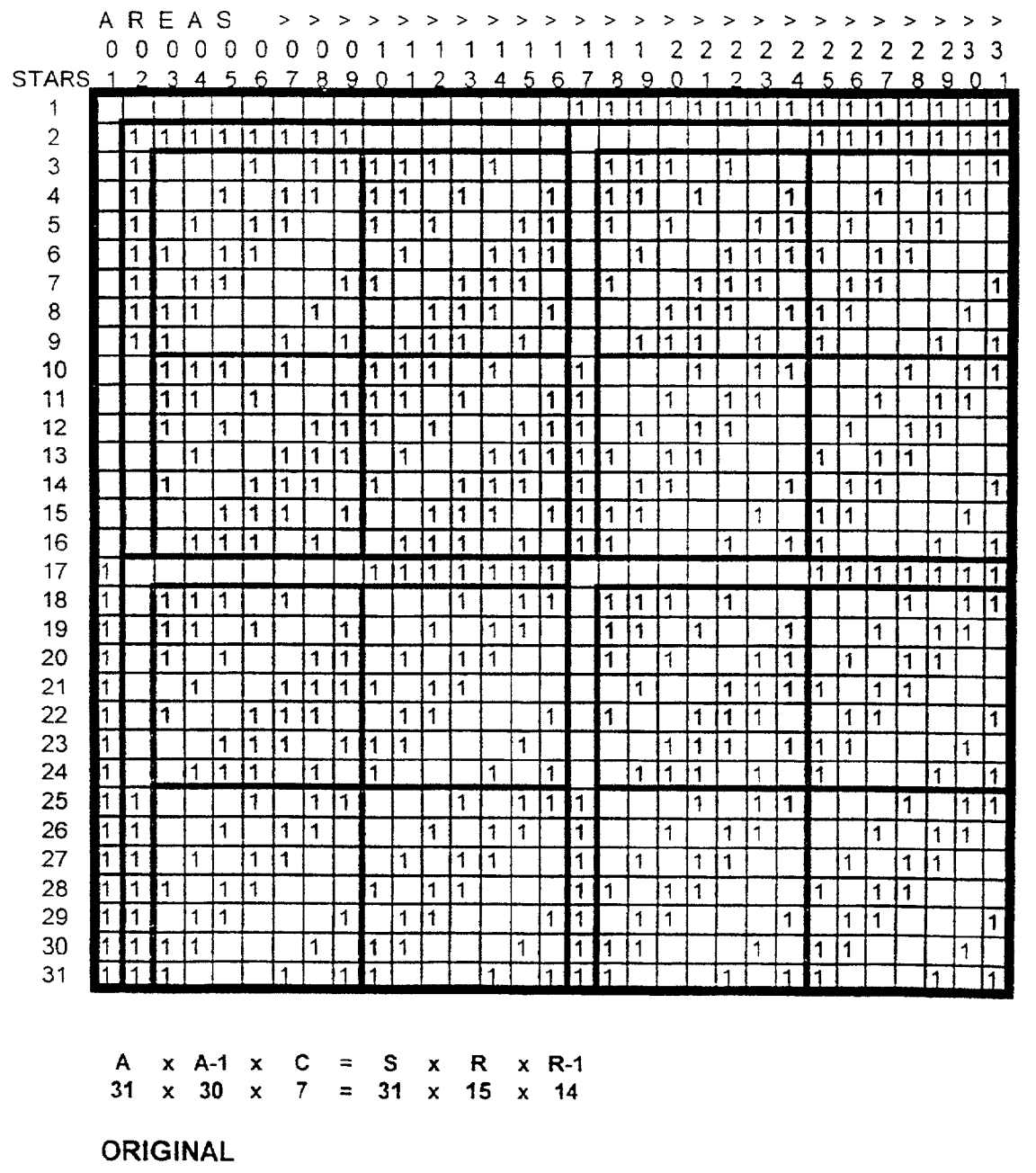
Figure 42:
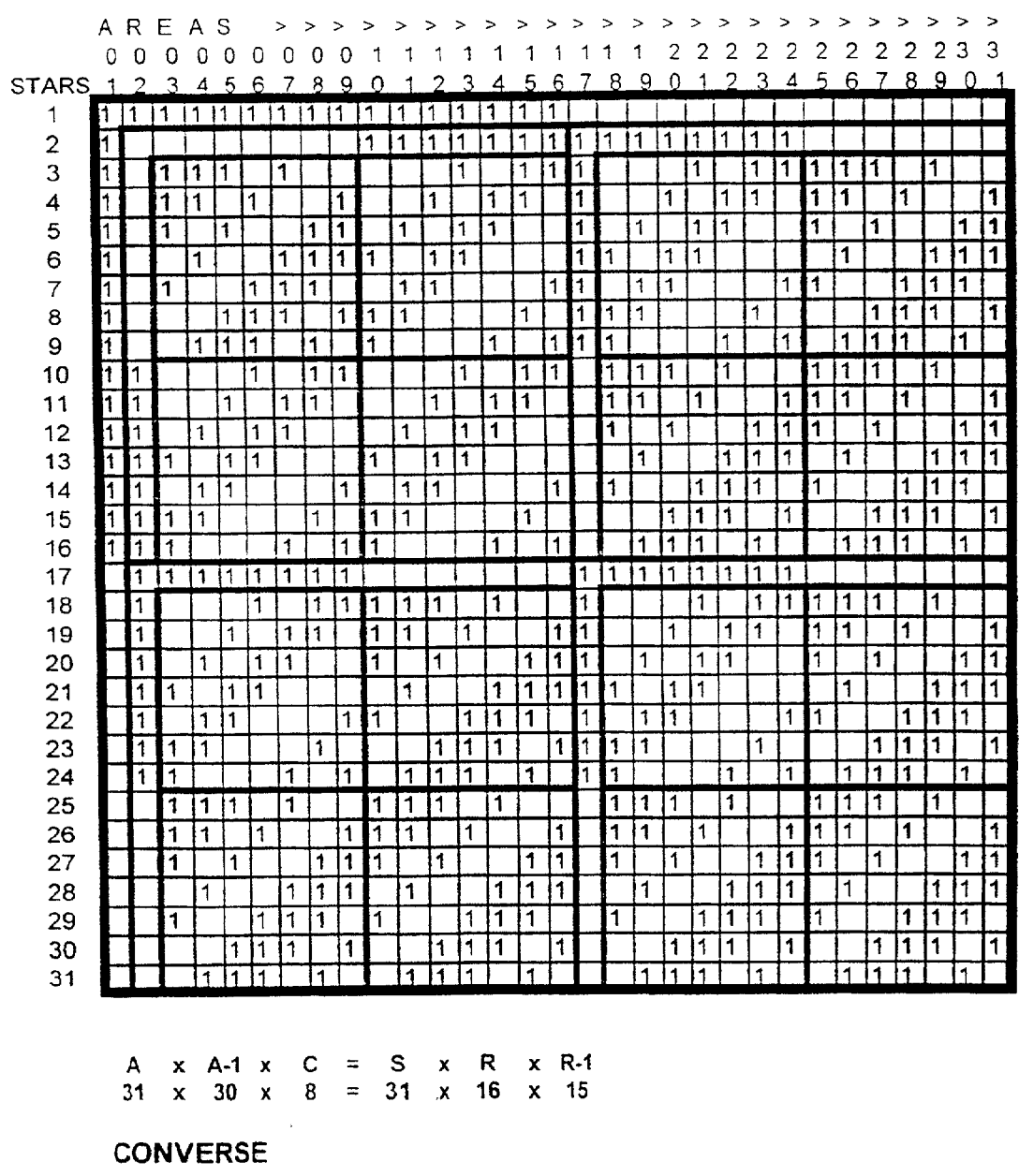

In FIGS. 41 and 42 are shown 31 AREAs/31 STARs, 7 CHOICE and 8 CHOICE patterns respectively, formed from 3 Original 15×15 patterns and 1 Converse 15×15 pattern and 1 Original 15×15 pattern and 3 Converse 15×15 patterns, respectively.

The Rotational patterns for 31 AREAs/STARs and 63 AREAs/STARs patterns are known and hence the converses are also known. The larger patterns for 127 AREAs/STARs, 255 AREAs/STARs, 511 AREAs/STARs, etc can be constructed, in a similar manner shown.

The 64 kbit/s switch DSS (Digital Switching Subsystem) mk2 as used in System X and as described in patent GB2212364B, in particular FIGS. 3 and 4 thereof as shown in FIGS. 43 and 44 respectively herein has;

| 256 first stage switching elements | (256 × 384 channels) |
|---|---|
| 384 second stage switching elements | (256 × 256 channels) |
| 256 third stage switching elements | (384 × 256 channels) | where the unsquare switching elements are each formed form two 256×256 channel switching Integrated circuits. System X is a Stored Program Control exchange system first installed in the United Kingdom.

This telecommunications switch has a partial CLOS expansion of 256 to 384 second stage switching elements, so although DSS Mk2 is not a fully non-blocking, switch it has an extremely low blocking probability. Thus DSS mk2 handles 2048 PCMs of 2 Mbit/s and switches a total of 65,536 channels of 64 kbit/s. By using the largest of the pattern listed above, namely 511 AREAs, 511 STARs, 256 ROUTEs and 128 CHOICEs, a switch of 4080 Pulse Code Modulation (PCMs) of 2 Mbit/s, handling 130,560 channels can be constructed with a similar blocking probability to the original DSS mk2 as used in System X. This new switch could be formed from:

| 511 first stage switching elements | (256 × 512 channels) |
|---|---|
| 1022 second stage switching elements | (256 × 256 channels) |
| 511 third stage switching elements | (512 × 256 channels) | where the unsquare switching elements are each formed from two 256×256 channel switching Integrated circuits.

The 511 first stage switching elements (using 256 of the outputs of each switching element) are connected to 511 of the second stage switching elements which in turn are connected to the 511 third stage switching elements (using 256 of the inputs of each switching element) by employing the connection pattern mentioned above.

An identical connection pattern is used to connect the other 256 outputs of the first stage switching elements to the other 511 second stage switching elements which in turn are connected to the remaining 256 inputs of the third stage switching elements.

However as the switching elements already have 8 outputs a more practical implementation would be to use 8 Partially Interconnected Networks in parallel. Consequently by using the pattern with 63 AREAs, 63 STARs, 32 ROUTEs and 16 CHOICEs as shown in FIG. 46, a switch of 4032 PCMs of 2 Mbit/s, handling 129,024 channels can be constructed with a similar blocking probability to the original DSS mk2 as used in System X. This new switch could be formed from:

| 504 first stage switching elements | (256 × 512 channels) |
|---|---|
| 1008 second stage switching elements | (256 × 256 channels) |
| 504 third stage switching elements | (512 × 256 channels) | where the unsquare switching elements are each formed form two 256×256 channel switching Integrated circuits.

With reference to FIG. 4 of the said patent (FIG. 44 herewith), the 32×32 Demultiplexing/Mixing/Remultiplexing (DMR) devices would become 63×63 DMR devices, but still only having a 32 timeslot loop. The other changes to the diagram would be:

8×16 DSMs in first stage

0–503 first stage PLANEs

0–4031 PCM lines into first stage

0–15 SUPER PLANES each with 0–62 DSMs

16×8 DSMs in third stage

0–503 third stage PLANEs

0–4031 PCM lines out from third stage

The transfer function of the resulting DMR is shown in FIGS. 45A and 45B which are combined horizontally.

There are many ways that partially Interconnected Networks can be deployed.

One of the most important aspects of large networks is their need to grew (or contract) over a period of time.

The first example explains the concept of having many outer nodes in an AREA.

The second example uses a combination of a Perfect Pattern and an Imperfect Pattern to enable a network to be doubled in size.

The third example uses a Partially Interconnected topology, but uses a distributed mesh of switches to form each STAR.

The fourth example has several similar Partially Interconnected Network where corresponding STARs in each network are connected together using a distributed mesh topology.

1: A Basic Example

Considering 20 nodes that need to be interconnected where it is deemed impractical to connect all the nodes into a mesh, or to connect all the 20 nodes to one or two central nodes (for example because of power or port limitations). It is also required normally that for redundancy there must be at least two routings through the network. There is no perfectly regular twin CHOICE interconnection pattern with say 20 Outer Nodes and about 6 central nodes each with no more than 12 ports. In most networks the perception is that if there are a number of Outer Nodes then a lesser number of central nodes are required to join them together.

For example the average PSTN has more Local exchanges than Trunk Exchanges. However, if some compromises are made to the basic example then a practical solution is available. FIG. 46, which is based on the twin CHOICE network of FIG. 13 which shows an arrangement where there are actually 21 Outer Nodes and 7 STARs (Central Nodes). An Outer Node can be omitted to meet the requirement of 20.

It may seem to be a five stage network:

Outer Node-AREA-STAR-AREA-Outer Node:

but the AREAs can purely be patch panels, or a fixed setting on a cross-connect, because an AREA does not have to be an active Switching Node.

FIG. 47 shows in more detail the arrangements around the AREA 4. The connection from a STAR into an AREA can consist of 3 links which each go directly to associated Outer Nodes. As a STAR, in this example, is connected to 4 AREAs, the STAR has links to 12 of the Outer Nodes provided all AREAs have 3 Outer Nodes. However regardless of the number of Outer Nodes within an AREA, all the Outer Nodes are connected to 4 STARs.

Even if the example had specified 21 Outer Nodes and 7 STARs, there is, still a compromise in this network. An Outer Node should have just have a CHOICE of two routings to each of the other Outer Nodes. Outer Nodes connected to Outer Nodes in other AREAs have 2 routings, but Outer Nodes have 4 CHOICEs of routing to each of the other 2 Outer Nodes belonging to their own AREA. This is a direct consequence of having more than one Outer Node per AREA. However in many networks there is more traffic within an AREA than between AREAs.

Two points to be remembered are: firstly that the network routing pattern can be expressed as a simple table (especially where based on rotational patterns); and secondly that once the routing pattern has been defined the actual capacity of the individual connections and paths do not have to be the same size. In the PSTN for example a connection is normally made up from multiple primary rate multiplexes and this can still continue.

The segregation of Outer Nodes into AREAs should be done not necessarily so that there are the same number of Outer Nodes per AREA, but that the total traffic generated by an AREA should preferably not be widely dissimilar from the other AREAs.

A characteristic that can also be seen in FIG. 46 is that each AREA has, adjacent to it, a STAR of the same number. This can mean that most traffic between Outer Nodes, associated with the same AREA, can be routed via a nearby STAR, although an, of the STARs connected to that AREA can be used as alternatives.

There is a possible disadvantage with being connected to a STAR on the same site as the AREA Crossconnect. The two alternative routings between two Adjacent AREAs may be carried by the same transmission system. There are patterns which ensure the alternative routings do not go along the same notional link, but these tend to require that an AREA N is not connected to a STAR N.

PSTN

The basic example can be directly deployed by the PSTN.

A long distance path across a large PSTN normally results in the path passing through more than one Trunk Exchange. Partially Interconnected Networks are suited for 3-Stage networks. And so 3-stage structures must be created in order to take advantage of Partially Interconnected Networks for all types of Network.

In this basic example a 3-stage arrangement is achieved by making the Local Exchanges (Outer Nodes) the first and the third stages and having one level of Trunk Exchanges (STARs) to act as the second stage. In order to do this the Local Exchanges must have some network routine capability as multiple STAR Trunk Exchanges will be directly connected to each Local Exchange.

The basic example described used one of the standard Twin CHOICE patterns. Unfortunately the list of these is not very long. So choosing the initial pattern is restricted and growing by transforming to the next pattern will seldom if ever be ideal.

2: A Combination of Perfect and Imperfect Patterns Example

As most large networks need redundancy either a Twin CHOICE network, or two Single CHOICE networks, will be required initially.

When the number of AREAs equals the number of STARs, then assuming a STAR can handle a certain amount of traffic, then each AREA should on average be organised to generate up to that amount of traffic. If there are twice the number of STARs to AREAs then an AREA should generate on average up to twice the capacity of a STAR.

To grow two Single CHOICE networks can be done by adding a third Single CHOICE network with the same number of AREAs and STARs as the first two. This gives a 50% increase in capacity.

Adding a Single CHOICE network to an existing Twin CHOICE network would be much better as firstly the self balancing of a twin CHOICE network is much better than that of two Single CHOICE Networks and secondly 100% growth could be achieved if the single and twin CHOICE networks have the same number of STARs. Unfortunately apart from 7 AREAs and 7 STARs networks which both have twin and single CHOICE Perfect patterns versions, none of the others do. However a large range of Imperfect patterns exist.

So if the 37 AREAs and 37 STARs Twin CHOICE network is used initially, then an Imperfect pattern with 37 AREAs and with 37 (or more) STARs can be added as required.

For the 37 AREAs and 37 STARs Twin CHOICE network, because the STARs are connected to 9 AREAs, the load balancing is very good, consequently under fault conditions if one STAR Trunk is unavailable its traffic is shared across all the other 36 STAR Trunks. This could be regarded as the ultimate automatic '1 in N sparing' Network.

Perhaps the ideal way to grow a Twin CHOICE Partially Interconnected Network would be to add individual STARs, of a Single CHOICE Constellation, as the average Network Load increases. The load balancing algorithm used needs to ensure that sufficient traffic is carried by the added STARs.

For a Twin CHOICE network with 37 AREAs and 37 STARs, it would be convenient if there was also a perfect Single CHOICE network with 37 AREAs and 37 STARs, because there cannot be a Perfect Partially Interconnected Network with STARs less than AREAs. Unfortunately there is no perfect pattern, with 37 AREAs and 37 STARs, but as has been mentioned earlier several patterns for 37 AREA networks have been listed.

There is a Multi-Rotational pattern with 37 AREAs which has 111 STARs each with 4 ROUTEs. However these STARs which have 4 ROUTEs only support paths between 6 AREAs, whereas STARs with 9 ROUTEs support 36 paths. So it seems sensible to try and use STARs with as many ROUTEs as possible.

The following Imperfect patterns with 37 AREAs have already been described::

A Single CHOICE pattern with 54 STARs: 1 STAR of 7 ROUTEs; 23 STARs of 6 ROUTEs; and 30 STARs of 5 ROUTEs;

A Single CHOICE pattern with some extra paths with 37 STARs all of 7 ROUTEs;

Either of the above could be used to expand the capacity, but the last one having STARs with 7 ROUTEs will probably give the most flexible network. This is shown in FIG. 48.

There are also some other options which may be of use in certain circumstances:

a) adding a smaller constellation onto some of the AREAs;

b) adding a smaller constellation onto larger AREAs;

c) adding a STAR in parallel with each overloaded STAR;

Because of the self balancing nature of a twin CHOICE 37 AREAs and 37 STARs network, the incremental addition of individual STAR Trunks as traffic increases allows for increases of traffic to be fairly easily catered for. The addition of 37 more STARs should allow for the load to double.

Another example of a combination of a Perfect and an Imperfect Pattern could be with an Imperfect Twin CHOICE pattern of 57 AREAs and 57 STARs and a Perfect Single CHOICE 57 AREAs and 57 STARs.

FIG. 48 is suitable for a large PSTN. The secured AREA function could be a pair of SDH crossconnects and most of the links could be one (or more) STM-1 equivalents. It uses the Trunk exchanges very effectively as only one needs to be traversed for any connection. Although the crossconnect makes the transmission much more straight forward than for an equivalent mesh network, the number of ROUTEs that have to be supported by the local exchanges is quite large.

3: A Single Partially Interconnected Network Example with a Distributed Mesh of Switches to Form Each Star For small Partially interconnected networks the outer switches of each AREAs (e.g. local exchanges) are only connected to a few STARs, just 4 in the case of FIG. 46. However the outer switches are connected to a great many more STARs for large Partially Interconnected Networks such as 16 STARs in FIG. 48. So although in is only necessary to go through one central switch, it may be considered unacceptable to have each outer switch connected to so many STARs.

Combinations of Partially Interconnected Networks and Mesh networks are possible as explained in this and the next example.

The mesh network as shown in FIG. 2 has only 7 AREAs. Some mesh networks may ideally need to have as many as a hundred major switches or routers connected together in a mesh. As already mentioned this would not be the easiest of implementations.

FIG. 49, which is derived from the twin CHOICE network of FIG. 23, represents a network which contains 7 separate mesh networks (instead of 7 STARs). The Outer Nodes, as represented in AREA 2, are each connected to 4 of the mesh nodes. For simplicity each mesh is shown has having four switches in the main part of FIG. 49. Hence with this arrangement, there are two paths available, via two different meshes, between an Outer Node in one AREA and an Outer Node in another AREA. (The circular symbols represent part of the transmission medium and need not be active switches.)

In this example the Outer Nodes of an AREA are connected to the same 4 switches in each of 4 Distributed Mesh STARs which will be referred to later.

For larger networks each STAR mesh can of course contain more switches than four. If a STAR mesh contained say 12 switches, (giving a total of 84 switches) then the Outer Nodes in an AREA could be connected to one of 3 switches in a mesh (they would still be connected to 4 STAR meshes). In which case the transmission used to connected the switches together in a STAR mesh could also be of the form of a Partially Interconnected Network, as shown in the insert (FIG. 49A) of FIG. 49, using 4 Transmission STAR Nodes A. B. C and D. This corresponds to the first Twin CHOICE pattern in list 2, which has 4 AREAs. Each AREA containing a multiple set of switches.

It should be remembered that smaller meshes, need less ports and therefore each port can be of high bandwidth.

Larger networks can also be made by using larger Partially Interconnected networks and more STAR mesh networks: or in some cases a very large (STAR) Router instead of a STAR mesh, where the distributed nature of a STAR mesh is not required and the switches has sufficient ports.

A useful feature of this example is that the 7 meshes can be grown independently of each other.

4: Multiple Partially Interconnected Networks Example with Mesh Corrections Between Corresponding Stars In the previous example it was noted that the Outer Nodes of an AREA are connected to the same 4 switches in each of 4 Distributed Mesh STARs. This results in a fully connected network of the type shown in FIG. 1. This is a less efficient network structure as compared with this next example. FIG. 49 shows a total of 28 switches, making the 7 STARs. It is only the connections within the same AREA, which traverse just one switch; and they are a seventh of the possible network connections.

It should not be assumed that connection destinations always are randomly spread across the network. However for the purposes of simple comparisons that has been assumed.

FIG. 50 shows 4 Regional Partially Interconnected Networks, where connections within a region need only pass through one STAR. The total network has 28 switches again, but this time the fraction of connections traversing one switch is now a quarter.

Star Trunks when used to implement Partially Interconnected Networks enable far more effective trunk networks to be achieved than by the use of the present two-stage network as shown in FIG. 2. Double and Triple Connectivity patterns are very appropriate to new operator networks. The technique can also be applied to Router networks and transmission (e.g. Megastream) networks.

From the foregoing it can be appreciated that the scope for arrangements conforming to the present invention is extremely large.

The invention claimed is:

1. A partially interconnected network, comprising:
a plurality of Allocated Nodes each allocated to one of a number of Areas (AREAs); a plurality of Star Nodes (STARs); point-to-point interconnections between the Allocated Nodes and the STARs; a number of AREAs with Allocated Nodes which are interconnected to an individual STAR forming a number of Routes (ROUTEs) from the individual STAR; the Allocated Nodes of a first of the AREAs being interconnected to a set comprising some, but not all, of the STARs; further of the AREAs being interconnected to further sets each comprising STARs; at least one interconnection choice (CHOICE) between any two Allocated Nodes being in different AREAs; and wherein an interconnection route comprising two point-to-point interconnections interconnected in series by one of the STARs, $$(AREAs) \times (AREAs-1) \times (CHOICEs) = (STARs) \times (ROUTEs) \times (ROUTEs-1) \text{ and}$$

$$(STARs) \times (ROUTEs)/(AREAs) = \text{a positive integer}.$$

2. The partially interconnected network as claimed in claim 1, wherein there is an equal number of CHOICEs of ROUTEs between any two of the Allocated Nodes in different AREAs, and wherein there is an equal number of ROUTEs from each STAR.

3. The partially interconnected network as claimed in claim 1, wherein there is an equal number of CHOICEs of ROUTEs between any two of the Allocated Nodes in different AREAs.

4. The partially interconnected network as claimed in claim 3, wherein:

$$(AREAs) \times (AREAs-1) \times (CHOICEs) = (STARs1) \times (ROUTEs1-1) + (STARs2) \times (ROUTEs2-1) + (STARs3) \times (ROUTEs3-1) + \ldots + (STARsn) \times (ROUTEsn-1).$$

5. The partially interconnected network as claimed in claim 1, wherein there is an equal number of ROUTEs from each STAR.

6. The partially interconnected network as claimed in claim 5, and further comprising extra paths (EXTRA), wherein:

$$(AREAs) \times (AREAs-1) \times (CHOICEs) = (STARs) \times \{(ROUTEs) \times (ROUTEs-1) - (EXTRA)\}.$$

7. The partially interconnected network as claimed in claim 5, and further comprising missing paths (MISSING), wherein:

$$(AREAs) \times (AREAs-1) \times (CHOICEs) = (STARs) \times \{(ROUTEs) \times (ROUTEs-1) + (MISSING)\}.$$

8. The partially interconnected network as claimed in claim 1, wherein at least one of the AREAs contains one Allocated Node.

9. The partially interconnected network as claimed in claim 1, wherein each point-to-point interconnection comprises a multiple circuit transmission system.

10. The partially interconnected network as claimed in claim 1, wherein at least one of the point-to-point interconnections passes through an AREA cross-connect.

11. The partially interconnected network as claimed in claim 1, wherein the plurality of STARs equals a number of AREAs or an integer multiple thereof; wherein a number of AREAs and the plurality of STARs are each cyclically identified; wherein modulo differences of identities allocated to the cyclically identified STARs in a set or sets, selected in pairs within each set, form a single contiguous sequence or multiple contiguous sequences, respectively, from one to one less than a number of cyclically identified AREAs; and wherein a remainder of the cyclically identified AREAs is interconnected each to a corresponding set of cyclically identified STARs which are each sequentially rotated by one from a former contiguous sequence to create a regular rotated interconnection pattern or regular rotated interconnection patterns.

12. The partially interconnected network as claimed in claim 11, wherein, in each pattern, each cyclically identified STAR is interconnected to a cyclically identified AREA having the same cyclical identifier as the STAR.

13. The partially interconnected network as claimed in claim 12, wherein the rotated contiguous sequence is transformed by reordering and/or renumbering the AREAs and/or reordering and/or renumbering the STARs while retaining an equal number of ROUTEs between any two Allocated Nodes in different AREAs.

14. The partially interconnected network as claimed in claim 13, wherein there is a second plurality of cyclically numbered STARs which is equal in number to the earlier plurality of cyclically numbered STARs creating a second interconnection pattern, and wherein the second interconnection pattern is a counter rotating version of the pattern of interconnections of the earlier plurality of cyclically numbered STARs.

15. The partially interconnected network as claimed in claim 1, wherein ROUTEs is a prime number or an integer power of a prime number; wherein AREAs equals $ROUTEs^2$; and wherein STARs equals $ROUTEs \times (ROUTEs-1)$.

16. The partially interconnected network as claimed in claim 1, wherein there is an odd integer number of STARs, each STAR having three ROUTEs interconnected thereto.

17. The partially interconnected network as claimed in claim 1, wherein AREAs and STARs share sites; and wherein pairs of the point-to-point interconnections do not have their terminations on the same pair of sites.

18. The partially interconnected network as claimed in claim 1, wherein at least one STAR comprises a plurality of distributed switches interconnected to form a mesh network.

19. The partially interconnected network as claimed in claim 1, wherein at least one STAR comprises a plurality of routers interconnected to form a mesh network.

20. The partially interconnected network as claimed in claim 1, wherein each ROUTE comprises a wave division multiplex (WDM) link.

21. The partially interconnected network as claimed in claim 20, wherein a number of wavelengths carried by each link is one less than the number of ROUTEs.

22. The partially interconnected network as claimed in claim 21, wherein individual wavelengths from one input WDM link are selectively taken to different output WDM links.

23. The partially interconnected network as claimed in claim 1, wherein at least one of the AREAs is without any of the Allocated Nodes.

24. The partially interconnected network as claimed in claim 1, wherein a number of the AREAs is interconnected to a further partially interconnected network having an equivalent number of the AREAs and a lesser number of STARs.

25. The partially interconnected network as claimed in claim 1, wherein the partially interconnected network is a telecommunications network.

26. A plurality of partially interconnected networks, each partially interconnected network comprising: a plurality of Allocated Nodes each allocated to one of a number of Areas (AREAs); a plurality of Star Nodes (STARs); point-to-point interconnections between the Allocated Nodes and the STARs; a number of AREAs with Allocated Nodes which are interconnected to an individual STAR forming a number of Routes (ROUTEs) from the individual STAR; the Allocated Nodes of a first of the AREAs being interconnected to a set comprising some, but not all, of the STARs; further of the AREAs being interconnected to further sets each comprising STARs; at least one interconnection choice (CHOICE) between any two Allocated Nodes being in different AREAs; and wherein an interconnection route comprising two point-to-point interconnections interconnected in series by one of the STARs, and each partially interconnected network having a same number of STARs;

and a corresponding STAR of each partially interconnected network being interconnected by a respective mesh network, $$(AREAs) \times (AREAs-1) \times (CHOICEs) = (STARs) \times (ROUTEs) \times (ROUTEs-1) \text{ and}$$

$$(STARs) \times (ROUTEs)/(AREAs) = \text{a positive integer.}$$

27. A three-stage switch, comprising: at least four interconnection choices (CHOICEs) between each pair of stages, each pair of stages being connected by a partially interconnected network comprising: a plurality of Allocated Nodes each allocated to one of a number of Areas (AREAs); a plurality of Star Nodes (STARs); point-to-point interconnections between the Allocated Nodes and the STARs; a number of AREAs with Allocated Nodes which are interconnected to an individual STAR forming a number of Routes (ROUTEs) from the individual STAR; the Allocated Nodes of a first of the AREAs being interconnected to a set comprising some, but not all, of the STARs; further of the AREAs being interconnected to further sets each comprising STARs; at least one of the CHOICEs between any two Allocated Nodes being in different AREAs; and wherein: an interconnection route comprising two point-to-point interconnections interconnected in series by one of the STARs, $$(AREAs) \times (AREAs-1) \times (CHOICEs) = (STARs) \times (ROUTEs) \times (ROUTEs-1) \text{ and}$$

$$(STARs) \times (ROUTEs)/(AREAs) = \text{a positive integer.}$$

* * * * *

UNITED STATES PATENT AND TRADEMARK OFFICE
CERTIFICATE OF CORRECTION

PATENT NO. : 7,167,453 B1
APPLICATION NO. : 10/031253
DATED : January 23, 2007
INVENTOR(S) : Chopping et al.

It is certified that error appears in the above-identified patent and that said Letters Patent is hereby corrected as shown below:

On the Title Page, in Field (75), under "Inventors", in Column 1, Line 2, delete "Thomad" and insert -- Thomas --, therefor.

In Column 3, Line 54, delete "(AREAs=" and insert -- (AREAs)= --, therefor.

In Column 5, Line 47, delete "Crosscomect" and insert -- Crossconnect --, therefor.

In Column 6, Line 25, delete "shows" and insert -- shown --, therefor.

In Column 8, Line 25, after "links" insert -- . --.

In Column 9, Line 32, delete "non-blocking," and insert -- non-blocking --, therefor.

In Column 10, Line 33, delete "grew" and insert -- grow --, therefor.

In Column 10, Line 44, delete "Network" and insert -- Networks --, therefor.

In Column 11, Line 41, delete "an," and insert -- any --, therefor.

In Column 14, Line 64, in Claim 1, after "and" delete "wherein".

In Column 14, Line 67, in Claim 1, after "STARs," insert -- wherein: --.

In Column 16, Line 64, in Claim 26, after "and" delete "wherein".

UNITED STATES PATENT AND TRADEMARK OFFICE
CERTIFICATE OF CORRECTION

PATENT NO. : 7,167,453 B1
APPLICATION NO. : 10/031253
DATED : January 23, 2007
INVENTOR(S) : Chopping et al.

It is certified that error appears in the above-identified patent and that said Letters Patent is hereby corrected as shown below:

In Column 17, Line 2, in Claim 26, after "network," insert -- wherein: --.

In Column 18, Line 6, in Claim 27, after "and" delete "wherein:".

In Column 18, Line 8, in Claim 27, after "STARs," insert -- wherein: --.

Signed and Sealed this

Tenth Day of February, 2009

JOHN DOLL
*Acting Director of the United States Patent and Trademark Office*